(12) United States Patent
Kobel et al.

(10) Patent No.: US 12,294,918 B2
(45) Date of Patent: *May 6, 2025

(54) ELEVATION BASED MACHINE LOCALIZATION

(71) Applicant: Oshkosh Corporation, Oshkosh, WI (US)

(72) Inventors: Korry D. Kobel, Oshkosh, WI (US); Fredric L. Yutzy, Oshkosh, WI (US); Dan Adamson, Oshkosh, WI (US); Stefan Eshleman, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/749,246

(22) Filed: Jun. 20, 2024

(65) Prior Publication Data

US 2024/0349018 A1 Oct. 17, 2024

Related U.S. Application Data

(63) Continuation of application No. 17/576,710, filed on Jan. 14, 2022, now Pat. No. 12,047,850.

(Continued)

(51) Int. Cl.
*H04W 4/08* (2009.01)
*B66F 9/06* (2006.01)
(Continued)

(52) U.S. Cl.
CPC ............... *H04W 4/08* (2013.01); *B66F 9/06* (2013.01); *B66F 9/0755* (2013.01);
(Continued)

(58) Field of Classification Search
None
See application file for complete search history.

(56) References Cited

U.S. PATENT DOCUMENTS 3,009,747 A 11/1961 Pitzer
4,099,761 A 7/1978 Cullings
(Continued)

FOREIGN PATENT DOCUMENTS

CN 102756997 A * 10/2012 ............ B66F 17/003
CN 107426770 B 12/2017
(Continued)

OTHER PUBLICATIONS

Canadian Office Action issued in connection with CA Appl. Ser. No. 3124181 dated Oct. 7, 2022.
(Continued)

*Primary Examiner* — Justin S Lee
(74) *Attorney, Agent, or Firm* — Foley & Lardner LLP

(57) ABSTRACT

A machine localization system includes a work machine including a chassis and an extendable implement, a first pressure sensor coupled to the work machine, a second pressure sensor located at a known elevation, and a computing system operably coupled to the work machine, the first pressure sensor, and the second pressure sensor. The computing system is configured to receive a first pressure reading from the first pressure sensor and a second pressure reading from the second pressure sensor, determine an elevation of the work machine based on at least the first pressure reading and the second pressure reading, determine a maximum operating height of the extendable implement based on at least the determined elevation, and configure the extendable implement to not exceed the maximum operating height.

20 Claims, 12 Drawing Sheets

Related U.S. Application Data

(60) Provisional application No. 63/138,015, filed on Jan. 15, 2021, provisional application No. 63/138,016, filed on Jan. 15, 2021, provisional application No. 63/137,867, filed on Jan. 15, 2021, provisional application No. 63/137,996, filed on Jan. 15, 2021, provisional application No. 63/138,003, filed on Jan. 15, 2021, provisional application No. 63/137,978, filed on Jan. 15, 2021, provisional application No. 63/137,950, filed on Jan. 15, 2021, provisional application No. 63/137,955, filed on Jan. 15, 2021, provisional application No. 63/138,024, filed on Jan. 15, 2021, provisional application No. 63/137,893, filed on Jan. 15, 2021.

(51) Int. Cl.

| | | |
|---|---|---|
| *B66F 9/075* | (2006.01) | |
| *B66F 9/12* | (2006.01) | |
| *B66F 11/04* | (2006.01) | |
| *G05B 19/4155* | (2006.01) | |
| *G05D 1/00* | (2006.01) | |
| *G05D 1/224* | (2024.01) | |
| *G05D 1/225* | (2024.01) | |
| *G05D 1/226* | (2024.01) | |
| *G05D 1/692* | (2024.01) | |
| *G06F 3/0482* | (2013.01) | |
| *G06F 3/0484* | (2022.01) | |
| *G06F 3/0488* | (2022.01) | |
| *G06Q 10/20* | (2023.01) | |
| *G06Q 30/0251* | (2023.01) | |
| *G06Q 30/0601* | (2023.01) | |
| *G07C 5/00* | (2006.01) | |
| *G07C 5/08* | (2006.01) | |
| *G08B 3/00* | (2006.01) | |
| *G08B 5/36* | (2006.01) | |
| *G08B 7/06* | (2006.01) | |
| *G08B 21/18* | (2006.01) | |
| *H04L 67/52* | (2022.01) | |
| *H04L 67/63* | (2022.01) | |
| *H04W 4/029* | (2018.01) | |
| *H04W 4/30* | (2018.01) | |
| *H04W 4/40* | (2018.01) | |
| *H04W 4/70* | (2018.01) | |
| *H04W 8/00* | (2009.01) | |
| *H04W 48/16* | (2009.01) | |
| *H04W 76/14* | (2018.01) | |
| *H04W 76/15* | (2018.01) | |
| *H04W 76/23* | (2018.01) | |
| *B66F 17/00* | (2006.01) | |
| *G06F 16/93* | (2019.01) | |
| *H04W 4/35* | (2018.01) | |
| *H04W 4/80* | (2018.01) | |
| *H04W 84/12* | (2009.01) | |
| *H04W 84/18* | (2009.01) | |
| *H04W 88/08* | (2009.01) | |

(52) U.S. Cl.
CPC ............ *B66F 9/07581* (2013.01); *B66F 9/12* (2013.01); *B66F 11/046* (2013.01); *G05B 19/4155* (2013.01); *G05D 1/0022* (2013.01); *G05D 1/0027* (2013.01); *G05D 1/0044* (2013.01); *G05D 1/005* (2013.01); *G05D 1/224* (2024.01); *G05D 1/225* (2024.01); *G05D 1/226* (2024.01); *G05D 1/692* (2024.01); *G06F 3/0482* (2013.01); *G06F 3/0484* (2013.01); *G06F 3/0488* (2013.01); *G06Q 10/20* (2013.01); *G06Q 30/0251* (2013.01); *G06Q 30/0611* (2013.01); *G06Q 30/0631* (2013.01); *G06Q 30/0641* (2013.01); *G07C 5/006* (2013.01); *G07C 5/0825* (2013.01); *G08B 3/00* (2013.01); *G08B 5/36* (2013.01); *G08B 7/06* (2013.01); *G08B 21/18* (2013.01); *H04L 67/52* (2022.05); *H04L 67/63* (2022.05); *H04W 4/029* (2018.02); *H04W 4/30* (2018.02); *H04W 4/40* (2018.02); *H04W 4/70* (2018.02); *H04W 8/005* (2013.01); *H04W 48/16* (2013.01); *H04W 76/14* (2018.02); *H04W 76/15* (2018.02); *H04W 76/23* (2018.02); *B66F 11/04* (2013.01); *B66F 17/006* (2013.01); *G05B 2219/45049* (2013.01); *G06F 16/93* (2019.01); *H04W 4/35* (2018.02); *H04W 4/80* (2018.02); *H04W 84/12* (2013.01); *H04W 84/18* (2013.01); *H04W 88/08* (2013.01); *H04W 88/085* (2013.01)

(56) References Cited

U.S. PATENT DOCUMENTS

| | | |
|---|---|---|
| 4,178,591 A | 12/1979 | Geppert |
| 4,315,652 A | 2/1982 | Barwise |
| 4,426,110 A | 1/1984 | Mitchell et al. |
| 4,461,608 A | 7/1984 | Boda |
| 4,572,567 A | 2/1986 | Johnson |
| 4,573,728 A | 3/1986 | Johnson |
| 4,810,020 A | 3/1989 | Powell |
| 5,026,104 A | 6/1991 | Pickrell |
| 5,092,731 A | 3/1992 | Jones et al. |
| 5,209,537 A | 5/1993 | Smith et al. |
| 5,330,242 A | 7/1994 | Lucky, Sr. |
| 5,493,881 A | 2/1996 | Harvey |
| 5,730,430 A | 3/1998 | Hodson et al. |
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,264,013 B1 | 7/2001 | Hodgins |
| 6,315,515 B1 | 11/2001 | Young et al. |
| 6,336,783 B1 | 1/2002 | Young et al. |
| 6,350,098 B1 | 2/2002 | Christenson et al. |
| 6,411,887 B1 | 6/2002 | Martens et al. |
| 6,447,239 B2 | 9/2002 | Young et al. |
| 6,474,928 B1 | 11/2002 | Christenson |
| 6,526,335 B1 | 2/2003 | Treyz et al. |
| 6,565,305 B2 | 5/2003 | Schrafel |
| 6,611,755 B1 | 8/2003 | Coffee et al. |
| 7,070,382 B2 | 7/2006 | Pruteanu et al. |
| 7,207,610 B1 | 4/2007 | Kauppila |
| 7,284,943 B2 | 10/2007 | Pruteanu et al. |
| 7,398,137 B2 | 7/2008 | Ferguson et al. |
| 7,556,468 B2 | 7/2009 | Grata |
| 7,559,735 B2 | 7/2009 | Pruteanu et al. |
| 7,721,857 B2 | 5/2010 | Harr |
| 7,878,750 B2 | 2/2011 | Zhou et al. |
| 7,934,758 B2 | 5/2011 | Stamey et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,514,058 B2 | 8/2013 | Cameron |
| 8,533,604 B1 | 9/2013 | Parenti et al. |

(56) References Cited

U.S. PATENT DOCUMENTS

| | | |
|---|---|---|
| 8,540,475 B2 | 9/2013 | Kuriakose et al. |
| 8,655,505 B2 | 2/2014 | Sprock et al. |
| 8,807,613 B2 | 8/2014 | Howell et al. |
| 8,833,823 B2 | 9/2014 | Price et al. |
| 9,028,193 B2 | 5/2015 | Goedken |
| 9,216,856 B2 | 12/2015 | Howell et al. |
| 9,387,985 B2 | 7/2016 | Gillmore et al. |
| 9,523,582 B2 | 12/2016 | Chandrasekar et al. |
| 9,624,033 B1 | 4/2017 | Price et al. |
| 9,694,776 B2 | 7/2017 | Nelson et al. |
| 9,880,581 B2 | 1/2018 | Kuriakose et al. |
| 9,886,565 B2 | 2/2018 | Nielsen et al. |
| 9,981,803 B2 | 5/2018 | Davis et al. |
| 10,018,171 B1 | 7/2018 | Breiner et al. |
| 10,035,648 B2 | 7/2018 | Haddick et al. |
| 10,196,205 B2 | 2/2019 | Betz et al. |
| 10,221,012 B2 | 3/2019 | Hund, Jr. |
| 10,311,526 B2 | 6/2019 | Takeda |
| 10,373,087 B1 | 8/2019 | Yang et al. |
| 10,457,533 B2 | 10/2019 | Puszkiewicz et al. |
| 10,663,955 B2 | 5/2020 | Kuikka |
| 10,796,577 B2 | 10/2020 | Katou et al. |
| 10,899,538 B2 | 1/2021 | Nelson et al. |
| 10,913,428 B2 | 2/2021 | Dingli |
| 10,977,943 B1 | 4/2021 | Hayward |
| 11,252,149 B1 | 2/2022 | Bang et al. |
| 11,888,853 B2 | 1/2024 | Childress et al. |
| 11,948,019 B1 | 4/2024 | Singh et al. |
| 12,200,783 B2 | 1/2025 | Kopchinsky et al. |
| 2002/0070862 A1 | 6/2002 | Francis et al. |
| 2002/0079713 A1 | 6/2002 | Moilanen et al. |
| 2002/0123345 A1 | 9/2002 | Mahany et al. |
| 2003/0158640 A1 | 8/2003 | Pillar et al. |
| 2004/0114557 A1 | 6/2004 | Bryan et al. |
| 2005/0002354 A1 | 1/2005 | Kelly et al. |
| 2005/0140154 A1 | 6/2005 | Vigholm et al. |
| 2005/0149920 A1 | 7/2005 | Patrizi et al. |
| 2007/0130296 A1 | 6/2007 | Kim |
| 2007/0213869 A1 | 9/2007 | Bandringa et al. |
| 2009/0005928 A1 | 1/2009 | Sells et al. |
| 2009/0049441 A1 | 2/2009 | Mii et al. |
| 2009/0088924 A1 | 4/2009 | Coffee et al. |
| 2009/0099897 A1 | 4/2009 | Ehrman et al. |
| 2009/0101447 A1 | 4/2009 | Durham et al. |
| 2010/0179844 A1 | 7/2010 | Lafergola et al. |
| 2011/0040440 A1 | 2/2011 | De Oliveira et al. |
| 2011/0081193 A1 | 4/2011 | Nilsson |
| 2012/0001876 A1 | 1/2012 | Chervenka et al. |
| 2012/0046809 A1 | 2/2012 | Wellman |
| 2013/0057007 A1 | 3/2013 | Howell et al. |
| 2013/0127611 A1 | 5/2013 | Bernstein et al. |
| 2013/0132140 A1 | 5/2013 | Amin et al. |
| 2013/0240300 A1 | 9/2013 | Fagan et al. |
| 2014/0214240 A1 | 7/2014 | Funke et al. |
| 2014/0241332 A1 | 8/2014 | Yang et al. |
| 2014/0278621 A1 | 9/2014 | Medwin et al. |
| 2014/0312639 A1 | 10/2014 | Petronek |
| 2015/0185716 A1 | 7/2015 | Wichmann et al. |
| 2015/0310674 A1 | 10/2015 | Humphrey et al. |
| 2015/0376869 A1 | 12/2015 | Jackson |
| 2016/0052762 A1 | 2/2016 | Swift |
| 2016/0057004 A1 | 2/2016 | Ge |
| 2016/0121490 A1 | 5/2016 | Ottersland |
| 2016/0208992 A1 | 7/2016 | Parsons |
| 2016/0221816 A1 | 8/2016 | Pollock et al. |
| 2016/0272471 A1 | 9/2016 | Jaipaul |
| 2016/0304051 A1 | 10/2016 | Archer et al. |
| 2016/0318438 A1 | 11/2016 | Wadell |
| 2016/0371433 A1 | 12/2016 | Polesskiy et al. |
| 2017/0149901 A1 | 5/2017 | Condeixa et al. |
| 2017/0167088 A1 | 6/2017 | Walker et al. |
| 2017/0169631 A1 | 6/2017 | Walker et al. |
| 2017/0269608 A1 | 9/2017 | Chandrasekar et al. |
| 2017/0270490 A1 | 9/2017 | Penilla et al. |
| 2017/0289121 A1 | 10/2017 | Harwell |
| 2017/0291805 A1 | 10/2017 | Hao et al. |
| 2017/0301210 A1 | 10/2017 | King et al. |
| 2018/0065544 A1 | 3/2018 | Brusco |
| 2018/0143734 A1 | 5/2018 | Ochenas et al. |
| 2018/0150885 A1 | 5/2018 | Albinger et al. |
| 2018/0151037 A1 | 5/2018 | Morgenthau et al. |
| 2018/0164993 A1 | 6/2018 | Zummo et al. |
| 2018/0234266 A1 | 8/2018 | Rudolph et al. |
| 2018/0335903 A1 | 11/2018 | Coffman et al. |
| 2019/0033172 A1 | 1/2019 | Montemurro et al. |
| 2019/0156394 A1 | 5/2019 | Karmakar |
| 2019/0180354 A1 | 6/2019 | Greenberger et al. |
| 2019/0246060 A1 | 8/2019 | Tanabe et al. |
| 2019/0376459 A1 | 12/2019 | Pieczko et al. |
| 2020/0014759 A1 | 1/2020 | Wunderlich |
| 2020/0065433 A1 | 2/2020 | Duff et al. |
| 2020/0134955 A1 | 4/2020 | Kishita |
| 2020/0183362 A1 | 6/2020 | Ledwith et al. |
| 2020/0207166 A1 | 7/2020 | Froehlich |
| 2020/0298801 A1 | 9/2020 | Dingli |
| 2020/0317489 A1 | 10/2020 | Bhatia et al. |
| 2021/0023985 A1 | 1/2021 | Stadnyk |
| 2021/0055178 A1 | 2/2021 | Hinderling et al. |
| 2021/0056771 A1 | 2/2021 | Federle |
| 2021/0087035 A1 | 3/2021 | Yip et al. |
| 2021/0090363 A1 | 3/2021 | Ramos et al. |
| 2021/0211852 A1 | 7/2021 | Ramalho De Oliveira et al. |
| 2021/0232137 A1 | 7/2021 | Whitfield et al. |
| 2021/0250178 A1 | 8/2021 | Herman et al. |
| 2022/0025611 A1 | 1/2022 | Kandula et al. |
| 2022/0035364 A1 | 2/2022 | Laclef et al. |
| 2022/0156921 A1 | 5/2022 | Humpston et al. |
| 2022/0221365 A1 | 7/2022 | Mahurkar et al. |
| 2022/0229415 A1 | 7/2022 | Kobel et al. |
| 2022/0229431 A1 | 7/2022 | Kobel et al. |
| 2022/0230224 A1 | 7/2022 | Kobel et al. |
| 2022/0230488 A1 | 7/2022 | Kobel et al. |
| 2022/0232649 A1 | 7/2022 | Kobel et al. |
| 2023/0224680 A1 | 7/2023 | Kobel et al. |
| 2023/0247390 A1 | 8/2023 | Kobel et al. |
| 2024/0073651 A1 | 2/2024 | Kobel et al. |
| 2024/0089708 A1 | 3/2024 | Kobel et al. |

FOREIGN PATENT DOCUMENTS

| | | |
|---|---|---|
| CN | 207608281 U * | 7/2018 |
| CN | 111126522 A | 5/2020 |
| DE | 10 2007 020 182 A1 | 10/2008 |
| DE | 10 2018 217 716 A1 | 5/2019 |
| EP | 1 136 433 A2 | 9/2001 |
| EP | 2 886 507 A1 | 6/2015 |
| EP | 3 112 312 A1 | 1/2017 |
| EP | 3 173 369 A1 | 5/2017 |
| EP | 3 200 482 A1 | 8/2017 |
| EP | 3 896 024 A1 | 10/2021 |
| EP | 4 048 842 B1 | 8/2022 |
| JP | H08282995 A * | 10/1996 |
| JP | H1059698 A | 3/1998 |
| JP | 2016-159996 A | 9/2016 |
| JP | 2020-128270 A | 8/2020 |
| JP | 2021-052920 A | 4/2021 |
| WO | WO-01/30671 A2 | 5/2001 |
| WO | WO-2011/019872 A2 | 2/2011 |
| WO | WO-2012/109444 A2 | 8/2012 |
| WO | WO-2020/121613 A1 | 6/2020 |

OTHER PUBLICATIONS

International Search Report and Written Opinion issued in connection with PCT Appl. Ser. No. PCT/US2022/012610 dated Jun. 21, 2022 (19 pages).

Invitation to Pay Additional Fees issued in connection with PCT Appl. Ser. No. PCT/US2022/012610 dated Apr. 28, 2022 (136 pages).

Invitation to Pay Additional Fees issued in connection with PCT Appl. Ser. No. PCT/US2022/012628 dated May 13, 2022 (134 pages).

(56) References Cited

OTHER PUBLICATIONS

Notification of Transmittal of the International Search Report and the Written Opinion of the International Search Authority, or the Declaration issued in connection with PCT Appl. Ser. No. PCT/US2022/012603 dated Jul. 6, 2022 (27 pages).
Notification of Transmittal of the International Search Report and the Written Opinion of the International Search Authority, or the Declaration issued in connection with PCT Appl. Ser. No. PCT/US2022/012628 dated Jul. 6, 2022 (27 pages).
Suzuki et al., "Teleoperation of Multiple Robots through the Internet", IEEE International Workshop on Robot and Human Communication, published 1996, pp. 84-89 (Year: 1996).

* cited by examiner

ELEVATION BASED MACHINE LOCALIZATION

CROSS-REFERENCE TO RELATED PATENT APPLICATIONS

This application is a continuation of U.S. patent application Ser. No. 17/576,710, filed on Jan. 14, 2022, which claims the benefit of and priority to U.S. Provisional Application No. 63/137,950, filed on Jan. 15, 2021, U.S. Provisional Application No. 63/137,955, filed on Jan. 15, 2021, U.S. Provisional Application No. 63/137,996, filed on Jan. 15, 2021, U.S. Provisional Application No. 63/138,003, filed on Jan. 15, 2021, U.S. Provisional Application No. 63/138,015, filed on Jan. 15, 2021, U.S. Provisional Application No. 63/138,016, filed on Jan. 15, 2021, U.S. Provisional Application No. 63/138,024, filed on Jan. 15, 2021, U.S. Provisional Application No. 63/137,867, filed on Jan. 15, 2021, U.S. Provisional Application No. 63/137,893, filed on Jan. 15, 2021, and U.S. Provisional Application No. 63/137,978, filed on Jan. 15, 2021, all of which are hereby incorporated by reference herein.

BACKGROUND

Work equipment such as lifts and telehandlers sometimes require localization, tracking, tasking, monitoring, and servicing at a work site.

SUMMARY OF THE INVENTION

One exemplary implementation of the present disclosure relates to a machine localization system including a work machine communicatively coupled to a network, the work machine comprising a first pressure sensor; a second pressure sensor operably coupled to the network; and a computing system operably coupled to the network. The computing system is configured to determine a first relative elevation of the work machine relative to the first pressure sensor by comparing a first pressure reading from the first pressure sensor to a second pressure reading from the second pressure sensor.

In some aspects, the machine localization system includes a user device comprising the second pressure sensor and the computing system, wherein the user device is configured to display the first relative elevation of the work machine. In some aspects the computing system is further configured to determine a floor of a building on which the work machine is located. In some aspects, the first pressure sensor is coupled to a chassis of the work machine, the work machine further comprises a third pressure sensor coupled to an extendable implement of the work machine, and the computing system is further configured to determine a second elevation of the extendable implement relative to the chassis by comparing the first pressure reading to a third pressure reading from the third pressure sensor. In some aspects, the first pressure sensor and the second pressure sensor are configured to measure barometric pressure.

Another exemplary implementation of the present disclosure relates to a method of determining a relative elevation of a work machine. The method includes receiving, from a first pressure sensor coupled to a chassis of the work machine, a first pressure reading; receiving, from a second pressure sensor, a second pressure reading; and calculating a first relative elevation of the chassis of the work machine relative to the second pressure sensor by comparing the first pressure reading to the second pressure reading.

In some aspects of the method, the second pressure sensor is located on a known floor of a building, and the method further includes determining, based on the first relative elevation, a floor of the building on which the work machine is located. In some aspects, the second pressure sensor is coupled to a user device, and the method includes displaying the first relative elevation on a screen of the user device. In some aspects, the second pressure sensor is coupled to an extendable implement of the work machine, and the method further includes calculating an operational height of the extendable implement based on the first relative elevation. In some aspects, the extendable implement is a fork of a forklift or a work platform of a man lift. In some aspects, the method further includes transmitting, via a wireless network, the operational height to a remote computing system. In some aspects, the method further includes receiving, from a third pressure sensor located at a known elevation, a third pressure reading, calculating a second relative elevation of the chassis of the work machine relative to the third pressure sensor by comparing the first pressure reading to the third pressure reading, and determining a maximum operational height of the extendable implement based on at least the second relative elevation. In some aspects, the method further includes transmitting, to the work machine via a wireless network, the maximum operational height.

Another exemplary implementation of the present disclosure relates to a machine localization system comprising one or more processing circuits comprising one or more memory devices coupled to one or more processors. The one or more memory devices are configured to store instructions thereon that, when executed by the one or more processors, cause the one or more processors to receive, from a first pressure sensor coupled to a chassis of a work machine, a first pressure reading; receive, from a second pressure sensor, a second pressure reading; and calculate a first relative elevation of the chassis of the work machine relative to the second pressure sensor by comparing the first pressure reading to the second pressure reading.

In some aspects of the system, the first pressure sensor is located on a known floor of a building, and the instructions further cause the one or more processors to determine, based on the first relative elevation, a floor on which the work machine is located. In some aspects, the second pressure sensor is coupled to an extendable implement of the work machine, and the instructions further cause the one or more processors to calculate an operational height of the extendable implement based on the first relative elevation. In some aspects, the extendable implement is a fork of a forklift or a work platform of a man lift. In some aspects, the system further includes a connectivity module communicatively coupled to the one or more processing circuits and a wireless network, and the instructions further cause the one or more processors to transmit, via the connectivity module and the wireless network, the operational height to a remote computing system. In some aspects, the instructions further cause the one or more processors to receive, from a third pressure sensor located at a known elevation, a third pressure reading, calculate a second relative elevation of the chassis of the work machine relative to the third pressure sensor by comparing the first pressure reading to the third pressure reading; and determine a maximum operational height of the extendable implement based on at least the second relative elevation. In some aspects, the instructions further cause the one or more processors to transmit, to the work machine via a wireless network, the maximum operational height.

One exemplary implementation of the present disclosure relates to a local fleet connectivity system with elevation based machine localization. For example, a local fleet connectivity system with elevation based machine localization may include a pressure sensor on a work machine to determine a floor location for the machine in relation to a mobile user device or another machine where the machine is connected to other machines and user devices on a work site wireless mesh network. The local fleet connectivity system with elevation based machine localization may, for example, determine a relative pressure difference between a sensor on a machine chassis and an additional sensor at a load borne by the machine (e.g. a platform on the machine, forks on a telehandler, etc.) and use the pressure data to verify or calculate elevations. The local fleet connectivity system with elevation based machine localization may include a first pressure sensor on a user device (e.g., a phone), a machine, or a connectivity hub and a second pressure sensor onboard the machine to determine a local relative height differential between the user and the machine. In some examples, the local fleet connectivity system with elevation based machine localization may include a first pressure sensor on a base of a machine and a second pressure sensor on a platform of the machine to determine an operational height of the platform. The operational height may be transmitted for external consumption or may be used as part of the machine's local controls. The local fleet connectivity system with elevation based machine localization may include, for example, a network of communicatively connected work machines. In some implementations, the network connections may be one or more of a low energy wireless data network, a mesh network, a satellite communications network, a cellular network, or a wireless data network.

The local fleet connectivity system with elevation based machine localization may include, for example, one or more processing circuits comprising one or more memory devices coupled to one or more processors, the one or more memory devices configured to store instructions thereon that, when executed by the one or more processors, cause the one or more processors to: communicate across a wireless network by sending messages across nodes that are created by different machines and extend a connection with one nearby machine to a network of machines to connect to various machines across a work site. The local fleet connectivity system with elevation based machine localization then automatically identifies equipment connected to the network of machines. In some embodiments, the local fleet connectivity system with elevation based machine localization may be supported by an ad hoc machine to machine network. In some embodiments, the local fleet connectivity system with elevation based machine localization may be supported by a self-organizing network on a work site. In some embodiments, the communications means between machines connected to the network of machines may comprise wired networking, short range radio frequency networking (e.g. Bluetooth, Bluetooth Low Energy, Wi-Fi, VHF, or UHF), optical communications networking, or long range radio frequency networking (e.g. satellite communications). In some embodiments, the network of machines may be a mesh network. In some embodiments, access to machine-specific data from machines connected to the network of machines may be associated with one or more codes (e.g. a customer key). In some embodiments, the one or more codes may be associated with a fleet of equipment. In some embodiments, machine specific data may be accessed via the network for a machine connected to the local fleet connectivity system with elevation based machine localization where the machine is associated with a specific code (e.g. customer key). In some embodiments, machine specific data for a plurality of machines connected to the network of machines may be accessed via the network using a customer account. In some embodiments, machine specific data for all of the machines connected to the local fleet connectivity system with elevation based machine localization may be accessed via the network using a manufacturer account. In some embodiments, one or more messages may be generated in response to the state of a machine connected to the network of machines. In some embodiments, a change in the state of a machine connected to the network of machines may trigger the transmission of the one or more messages. In some instances, the one or more messages may be transmitted to a particular machine based on the code (e.g. customer key) associated with the machine This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
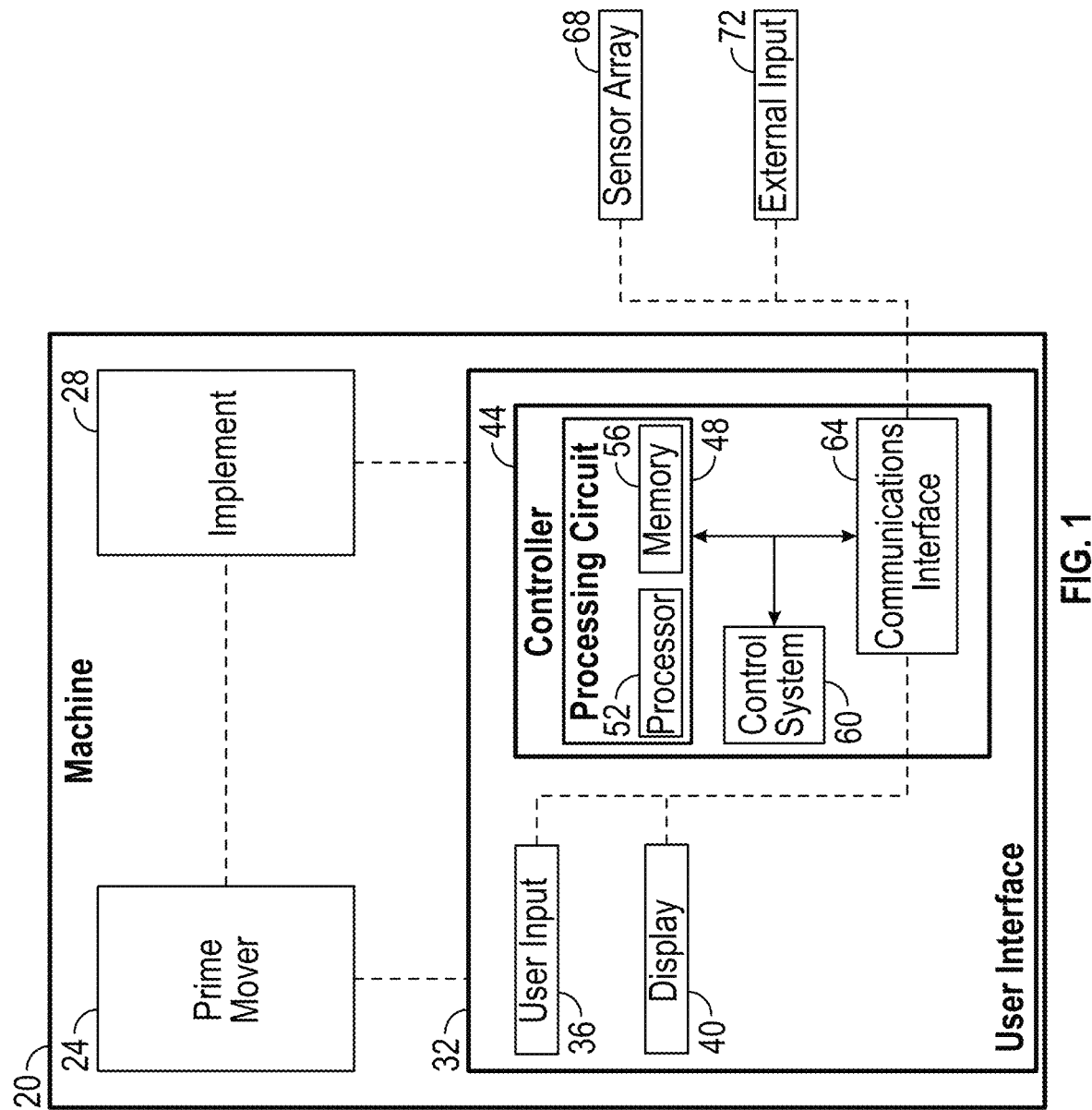
FIG. 1 is a schematic representation of a work machine including a machine control module according to some embodiments.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

At work sites with multi-level structures or height restrictions, it is desirable to provide systems and methods for determining a location of a machine and a vertical position of a machine implement or a machine load.

Referring to the figures generally, various exemplary embodiments disclosed herein relate to systems and methods for elevation based machine localization. For example, an elevation based machine localization system may use a pressure sensor on the machine to determine a floor at a work site structure that the machine in on within a mesh network with respect to a user's mobile device or another machine. The relative pressure difference between a machine chassis and a second sensor at a load (e.g. a platform, a set of forks, etc.) can be used for elevation verification and/or calculation. In another example, the elevation based machine localization system may use a first pressure sensor on a user's device (e.g., phone), one machine, or a hub and a second pressure sensor onboard the machine to determine the local relative height differential between the user and the machine.

In some embodiments, an elevation based machine localization system may use a first pressure sensor on the base of the machine and a second pressure sensor on the platform of the machine to determine the operational height of the platform. The operational height may be transmitted for external consumption or used as part of the machine's local controls.

Further referring generally to the figures, a system for elevation based machine localization may be configured as an element of a local fleet connectivity system. For example, Bluetooth Low Energy (BLE) Machine to Machine (M2M) communication protocols may be used to expand communication at a worksite/jobsite via local connectivity between machines at the worksite/jobsite. In some embodiments, a local fleet connectivity system with elevation based machine localization system may include various work machines, interface modules, work site equipment, communications devices, communications networks, user interface devices, devices hosting self-forming network software, and user interfaces. Users may include equipment users, equipment maintainers, equipment suppliers, worksite/jobsite supervisors, remote users, etc. The information provided to the local fleet connectivity system with elevation based machine localization may be communicated to users via a user interface. In some embodiments, the user interface may include a real time map, showing a current machine location and/or a machine status. In some embodiments, the user interface includes a color coded warning indicator, an audible alarm, or another indicator structured to communicate to the machine operator that the work machine is in a location or state that requires the attention of the operator.

As shown in FIG. 1, a work machine 20 (e.g., a telehandler, a boom lift, a scissor lift, etc.) includes a prime mover 24 (e.g., a spark ignition engine, a compression ignition engine, an electric motor, a generator set, a hybrid system, etc.) structured to supply power to the work machine 20, and an implement 28 driven by prime mover 24. In some embodiments, the implement 28 is a lift boom, a scissor lift, a telehandler arm, etc.

A user interface 32 is arranged in communication with the prime mover 24 and the implement 28 to control operations of the work machine 20 and includes a user input 36 that allows a machine operator to interact with the user interface 32, a display 40 for communicating to the machine operator (e.g., a display screen, a lamp or light, an audio device, a dial, or another display or output device), and a control module 44.

As the components of FIG. 1 are shown to be embodied in the work machine 20, the controller 44 may be structured as one or more electronic control units (ECU). The controller 44 may be separate from or included with at least one of an implement control unit, an exhaust after-treatment control unit, a powertrain control module, an engine control module, etc. In some embodiments, the control module 44 includes a processing circuit 48 having a processor 52 and a memory device 56, a control system 60, and a communications interface 64. Generally, the control module 44 is structured to receive inputs and generate outputs for or from a sensor array 68 and external inputs or outputs 72 (e.g. a load map, a machine-to-machine communication, a fleet management system, a user interface, a network, etc.) via the communications interface 64.

The control system 60 generates a range of inputs, outputs, and user interfaces. The inputs, outputs, and user interfaces may be related to a jobsite, a status of a piece of equipment, environmental conditions, equipment telematics, an equipment location, task instructions, sensor data, equipment consumables data (e.g. a fuel level, a condition of a battery), status, location, or sensor data from another connected piece of equipment, communications link availability and status, hazard information, positions of objects relative to a piece of equipment, device configuration data, part tracking data, text and graphic messages, weather alerts, equipment operation, maintenance, and service data, equipment beacon commands, tracking data, performance data, cost data, operating and idle time data, remote operation commands, reprogramming and reconfiguration data and commands, self-test commands and data, software as a service data and commands, advertising information, access control commands and data, onboard literature, machine software revision data, fleet management commands and data, logistics data, equipment inspection data including inspection of another piece of equipment using onboard sensors, prioritization of communication link use, predictive maintenance data, tagged consumable data, remote fault detection data, machine synchronization commands and data including cooperative operation of machines, equipment data bus information, operator notification data, work machine twinning displays, commands, and data, etc.

The sensor array 68 can include physical and virtual sensors for determining work machine states, work machine conditions, work machine locations, loads, and location devices. In some embodiments, the sensor array includes a GPS device, a LIDAR location device, inertial navigation, or other sensors structured to determine a position of the equipment 20 relative to locations, maps, other equipment, objects or other reference points.

In one configuration, the control system 60 is embodied as machine or computer-readable media that is executable by a processor, such as processor 52. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the control system 60 is embodied as hardware units, such as electronic control units. As such, the control system 60 may be embodied as one or more circuitry components including, but not limited to, processing circuitry, network interfaces, peripheral devices, input devices, output devices, sensors, etc. In some embodiments, the control system 60 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 60 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control system 60 may also include programmable hardware devices such as field programmable gate arrays, programmable array logic, programmable logic devices or the like. The control system 60 may include one or more memory devices for storing instructions that are executable by the processor(s) of the control system 60. The one or more memory devices and processor(s) may have the same definition as provided below with respect to the memory device 56 and processor 52. In some hardware unit configurations, the control system 60 may be geographically dispersed throughout separate locations in the machine. Alternatively, and as shown, the control system 60 may be embodied in or within a single unit/housing, which is shown as the controller 44.

In the example shown, the control module 44 includes the processing circuit 48 having the processor 52 and the memory device 56. The processing circuit 48 may be structured or configured to execute or implement the instructions, commands, and/or control processes described herein with respect to control system 60. The depicted configuration represents the control system 60 as machine or computer-readable media. However, as mentioned above, this illustration is not meant to be limiting as the present disclosure contemplates other embodiments where the control system 60, or at least one circuit of the control system 60, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 52) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., control system 60 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 56 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 56 may be communicably connected to the processor 52 to provide computer code or instructions to the processor 52 for executing at least some of the processes described herein. Moreover, the memory device 56 may be or include tangible, non-transient volatile memory or non-volatile memory. Accordingly, the memory device 56 may include database components, object code components, script components, or any other type of information structure for supporting the various activities and information structures described herein.

In an exemplary embodiment, the memory device 56 stores instructions for execution by the processor 52 for a process to automatically generate a work site equipment grouping. The process to automatically generate a work site equipment grouping automatically associates machines 20 connected on a near network to one or more other machines 20. In some embodiments, the automatic associations are based on rule stored on a work machine or on another network node. In some embodiments, the association rules are based on one or more of a work site designation, a location of a machine, or a code (e.g. a customer key, a manufacturer key, or a maintainer key).

Figure 2:
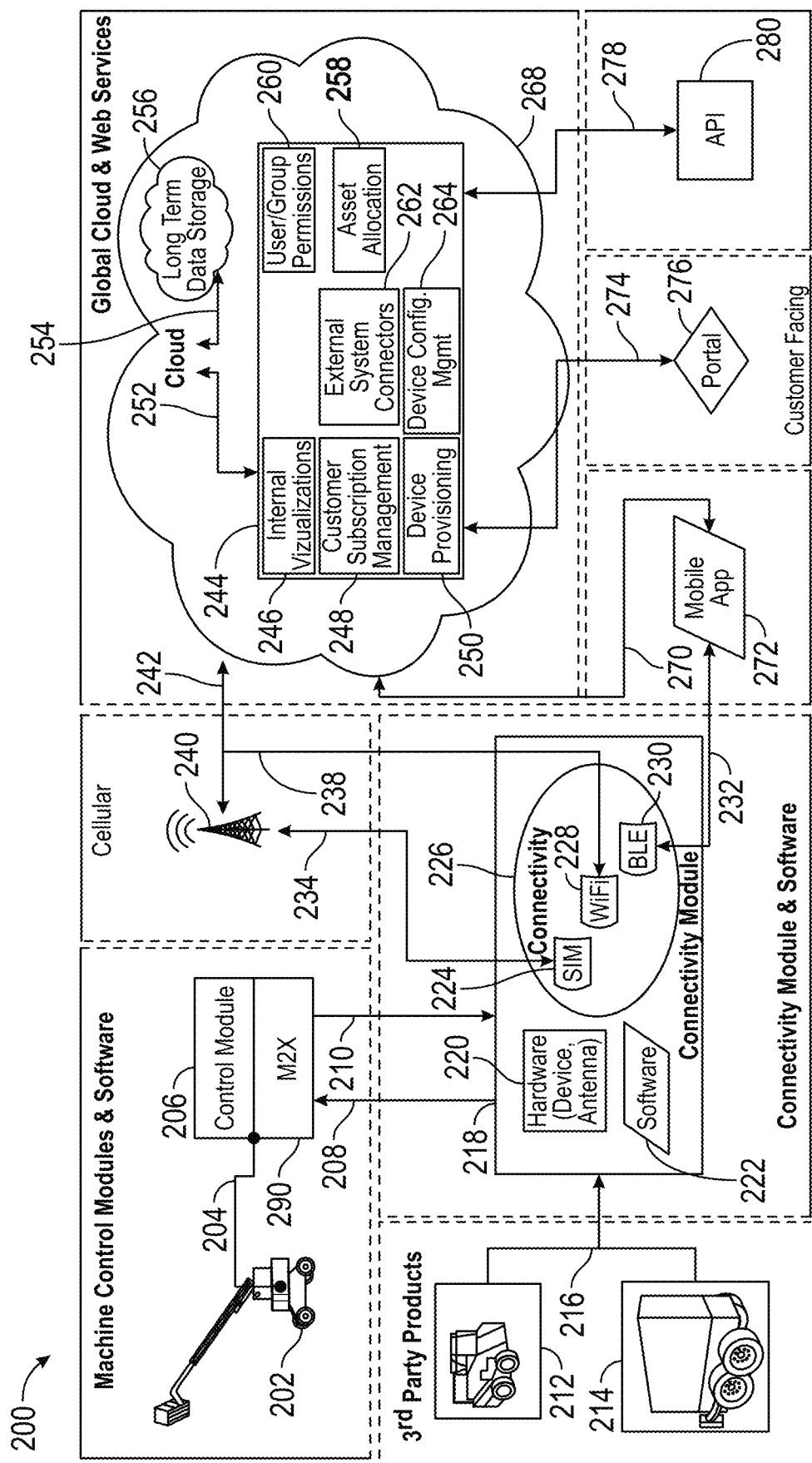
FIG. 2 is a schematic representation of a local fleet connectivity system with elevation based machine localization, according to some embodiments.

As shown in FIG. 2, the local fleet connectivity system with elevation based machine localization 200 is supported by a network of nodes. The network of nodes may include one or more work machines 202, each with a control module 206, one or more connectivity modules 218, and one or more network devices including user devices 272 hosting user interfaces, network portals 276, application interfaces/application programming interfaces 280, data storage systems 256, cloud and web services, and product development tool and application hubs 244.

The work machine 202 is communicably connected to a control module 206. The connection 204 between the work machine 202 and the control module 206 may be wired or wireless thus providing the flexibility to integrate the control module with the work machine 206 or to temporarily attach the control module 206 to the work machine 202. The control module 202 may be configured or may be reconfigurable in both hardware and software to interface with a variety of work machines 202, 212, 214 via the connectivity module 218. The control module 206 may comprise an integral power source or may draw power from the work machine 202 or another external source of power. Control modules 206 may be installed on or connected, e.g., via a connection 216 to products (e.g. third party products) 212, 214 not configured by the original product manufacturer with a control module 206.

The work machine 202 communicably connects to the local fleet connectivity system with elevation based machine localization 200 via a machine-to-X (M2X) module 290. The M2X module 290 is communicably connected to the control module 206. The M2X module 290 establishes one or more communications channels 208, 210 with a connectivity module 218. The connectivity module 218 provides a plurality of links between one or more work machines 202, 212, 214 and the local fleet connectivity system with elevation based machine localization 200. Applications providing functions for the local fleet connectivity system with elevation based machine localization 200 may be run by the M2X modules on one or more work machines 202. One or more user devices 272 may be configured to communicate (e.g., to exchange commands, codes (e.g. a customer key) and data) with the connectivity modules of one or more machines via a network connection, for example via a local wireless connectivity system or via a cellular networks (e.g., via cell towers 240) to form a network of interconnections among machines, devices, or nodes. Connections between machines and user devices in the local fleet connectivity system with elevation based machine localization 200 may be provided by a wireless mesh network, for example.

The connectivity module 218 comprises hardware 220, further comprising antennas, switching circuits, filters, amplifiers, mixers, and other signal processing devices for a plurality of wavelengths, frequencies, etc., software hosted on a non-volatile memory components 222, and a communications manager 226. The communications manager 226 may comprise processing circuits with communications front ends 224, 228, and 230 for one or more signal formats and waveforms including, for example, Bluetooth, Bluetooth low energy, Wi-Fi, cellular, optical, and satellite communications. The connectivity module 218 may function as a gateway device connecting work machine 202 to other work machines 212, 214, remote computing systems 244, 272, 276, and 280, beacons, scheduling or other fleet management and coordination systems.

The local fleet connectivity system with elevation based machine localization 200 allows for the coordination of multiple machines 202, 212, 214 within the same work site, or a fleet wide control. For example, a work machine 202 may remotely report the results of a self-inspection to a user via a user device 272.

The local fleet connectivity system with elevation based machine localization 200 provides connectivity between work machines 202, 212, 214 and user devices 272 including remotely hosted user interfaces, network portals 276, application interfaces/application programming interfaces 280, data storage systems 256, cloud and web services 268, and product development tool and application hubs 244 that function as an Internet of Things (IoT) system for operation, control, and support of work machines 202, 212, 214 and users of work machines. Connections 232, 234, 238, 242, 252, 254, 270, 274, and 278 between nodes connected to the local fleet connectivity system with elevation based machine localization 200 may comprise, for example, cellular networks (e.g., via cell towers 240), or other existing or new means of digital connectivity.

Product development tool and application hubs 244 may comprise tools and applications for internal visualizations 246, customer subscription management 248, device provisioning 250, external systems connectors 262, device configuration management 264, user/group permissions 260, asset allocation 258, fleet management, compliance, etc.

Figure 3:
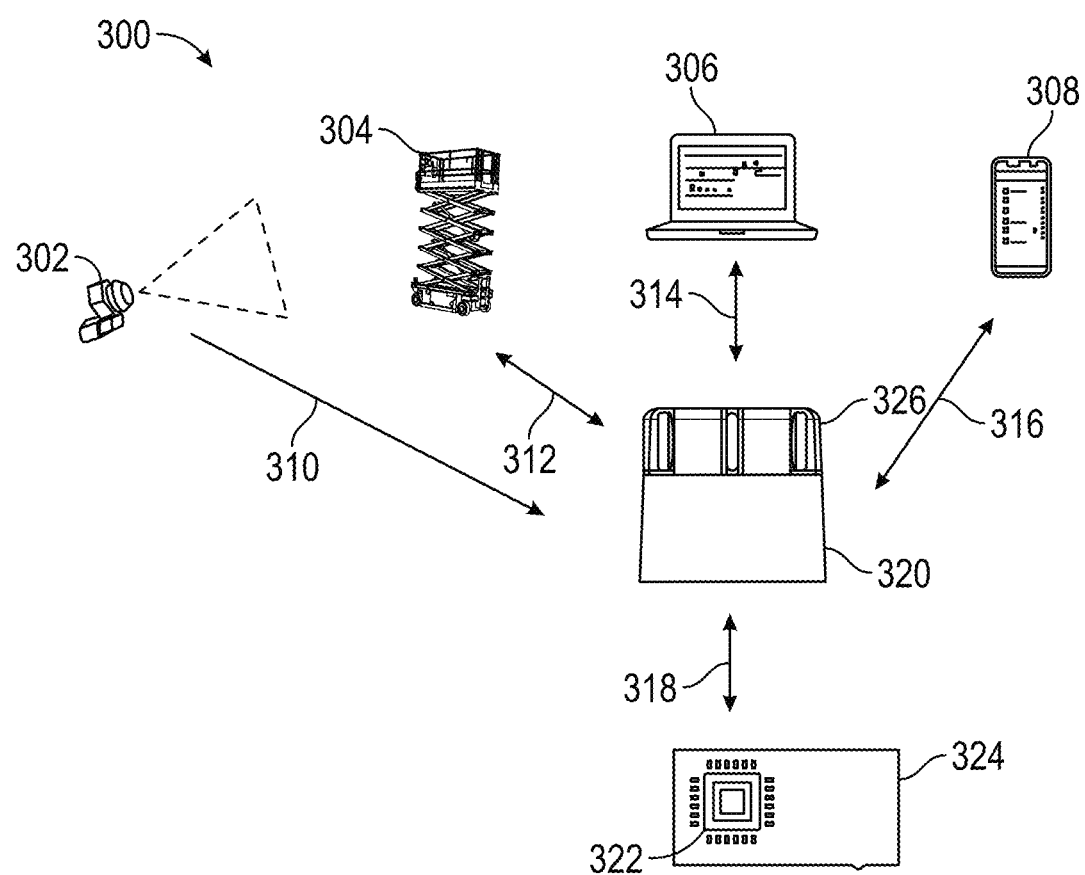
FIG. 3 is a schematic representation of a local fleet connectivity system with a central integration module, according to some embodiments.

FIG. 3 shows a local fleet connectivity system with elevation based machine localization 300 according to an exemplary embodiment. As shown in FIG. 3, the connectivity module 320 is communicably connected to a machine controller functions as a communications interface between a control system 322 of the work machine 324 and other elements connected to the local fleet connectivity system with elevation based machine localization 300. The connectivity module 320 may be part of the work machine 324 or may be physically coupled to the work machine 324. The connectivity module 320 may exchange commands and data 318 with the control system 322 of the work machine 324, sensor data 310 with auxiliary sensors 302, machine data 312 with another machine 304, sensor data with another machine 304, commands and data 314 with a node or remote computing device 306, and commands and data 316 with a user device 308 running an application for the local fleet connectivity system with elevation based machine localization 300. The connectivity module 320 may exchange commands, codes (e.g. a customer key) and data between work machines 304, 324, user devices 308, and/or remote computing devices 306 to form a network of interconnections among machines, devices, or nodes.

In some embodiments, the connectivity module 320 comprises a machine state visual indicator 326. The machine state visual indicator 326 provides a signal to an observer. For example, in response to a user selection on an application hosted on the user device 308, the machine state visual indicator 326 of one or more machines can provide a signal to the user. The signal may indicate a state or condition of the machine (e.g. power on, power off, in operation, fuel level, electrical system state of charge, diagnostic trouble code (DTC) status, maintenance required). In some examples, the machine state visual indicator 326 is an indicator module connected to the connectivity module 320. In other examples, the machine state visual indicator 326 may be a machine component or a separate device attached to the machine (e.g. a vehicle external light, a vehicle internal light, a beacon, etc.). The machine state visual indicator may be a light (e.g. an incandescent light, a light emitting diode, a fixed beacon, a flashing beacon, a rotating beacon, a laser, a light array, etc.), a display device, a marker, etc. In some examples, an audible indicator of a machine state may be incorporated in addition to or as an alternative to the machine state visual indicator 326. The audible indicator may be integrated into the connectivity module 320 or may be generated by the machine 324 (e.g., by a horn or speaker).

The machine state visual indicator 326 is configured to generate a variety of visual signals. In some examples, the variety of visual signals comprises one or more colors, patterns, and combinations of colors and patterns. In some examples, the machine state visual indicator is configured to generate visual signals observable as a light or one or more light patterns. In some examples, the light patterns generated by the machine state visual indicator 326 can be varied in any optical characteristic (e.g. color, wavelength, intensity, pulse duration, direction, etc.). In some examples, the machine state visual indicator 326 may incorporate an indication of an elevation of a work machine of a load, implement or an indication of a hazardous condition related to an elevation of a machine, load, implement, etc.

Visual signals generated by the machine state visual indicator show various states, conditions, and criteria of the machine. The visual signals may indicate, for example, one or more machines on a work site that have sufficient fuel levels to perform a task. In other examples, the visual signals generated by the machine state visual indicator 326 illustrate predefined or user configurable machine states for the local identification of that state. For example, a scissor lift machine 304 can flash a beacon light indicating that it requires a charge. In some embodiments, the visual signal may be initiated in response to a local user command 316 entered by a user at a user device 308, a remote user command, a machine to machine command, a condition or state detected by a machine onboard sensor, or a controller 322 logic determination.

In some embodiments, machine onboard sensors detect a state or condition of the machine 324. The machine controller 322 determines a command 318 to the connectivity module 320 or directly to the machine state visual indicator 326 to display one or more visual signals. In some embodiments, the machine state visual indicator 326 illuminates a colored light signal corresponding to a machine state or condition. For example, a work site supervisor may select green to indicate a fuel level above ¾ of capacity, yellow to indicate a fuel level between ¾ and ¼, and red to indicate a fuel level below ¼. In another example a service technician may transmit a wireless command to all machines on a work site to flash a red light if the machine controller detects a battery charge below a user specified level.

In some embodiments, a machine state visual indicator application hosted on a user device 308 presents a user interface to a user. The application user interface receives user selections of a criterion for a machine state and a visual signal corresponding to the criterion. For example, a user selects state of charge as a criterion for electric powered scissor lift machines 304 on a work site and one or more state visual indicator signals (e.g. a colored light) corresponding to one or more state of charge conditions. The user inputs are transmitted to machines 304, 324 via a network. User inputs received at the connectivity module 320 generate one or more commands to the machine visual state indicator 326. Each machine state visual indicator 326 for the machines at the work site then respond to the user input by displaying light beacon with a color representing a status of that machine for the selected criterion (e.g., Machines with good charges show green lights, machines requiring a recharge show yellow lights, and machines requiring battery replacement show red lights.).

The machine state visual indicator 326 is configurable to function when machine power is off. For example, the machine state visual indicator 326 may receive user inputs via a Bluetooth low energy (BLE) signal received at the connectivity module 320. The BLE communications path can be configured to remain always active with power input from a machine power source (e.g. a battery). In some examples, the BLE communications channel in the connectivity module 320 remains open and the machine state visual indicator is available to display a visual signal in response to a user input in a power saving mode (e.g. modified receiver duty cycles, reduced communications/BLE intervals, lower power operation of the machine state visual indicator beacon).

Further referring to FIG. 3, in some embodiments, the electronic identity system application may comprise electronic commerce functions. In some examples, electronic commerce functions are accessed through a tab or page within the application, a click-through popup within the application, a scrolling banner within the application, a push notification, etc. In some examples, the electronic commerce functions provided through the local fleet connectivity system with elevation based machine localization 300 may be managed by an electronic commerce application hosted on a controller installed in a machine 304, 324 or a user device 308. Electronic commerce functions provided through the local fleet connectivity system with elevation based machine localization may comprise, for example, original equipment manufacturer advertising (e.g. service kits, equipment consumables, replacement parts based on a status or condition of a machine). In some examples, electronic commerce messages are transmitted via the local fleet connectivity system with elevation based machine localization. Electronic commerce messages may comprise, for example, messages based on a specific machine or machines being accessed, a profile or a nature of a person accessing the specific machine or machines, weather or local conditions around the machine or machines, conditions or states associated with the machine (e.g., engine hours, fault codes, etc.), location of the machine, location of the work site, proximity of a vendor to a work site, etc. In some examples, the application is a point of sale portal for purchasing items or services identified in electronic commerce messages. For example, an original equipment manufacturer OEM) may determine a work machine component requires replacement based on the condition of the component as detected by a sensor on the work machine and reported to the OEM via the local fleet connectivity system with elevation based machine localization. The OEM may locate the nearest replacement part, determine a price and delivery time for the part and generate a push message to a user on a user device at a work site identifying the need to replace the component, the price and arrival time for the replacement component, a purchase incentive for ordering the component through the application, process the order through the user device, and provide post sale services (e.g. delivery status, installation instructions, warranty support) through the application.

Further referring to FIG. 3, in some embodiments, the machine controller 322 is configured to receive data from a first pressure sensor on the machine 324. For example the controller may receive a first barometric pressure reading from the first pressure sensor, which may be coupled to the chassis of the machine. In some embodiments, a controller 322 is configured to determine a relative height differential between a first pressure sensor and a second pressure sensor. The first pressure sensor measures a first pressure measurement at a first location and the second pressure sensor measures a second pressure at a second location. In some examples, the first pressure sensor is provided on a first machine 324 and communicatively connected to the controller 322. In some examples, the second pressure sensor is an off board (i.e. not located on the first machine) sensor. The second pressure sensors may be provided, for example, on a user device 308 (e.g., a phone), a second machine 304, a load, an implement, a work site hub device, etc. In some examples, the second pressure measurement at the second pressure sensor may be transmitted to the controller 322 of the first machine 324 via a direct local connection (e.g. a BLE connection, a Wi-Fi connection, etc.). In some examples, the second pressure measurement is transmitted by the second sensor to the controller 322 via a network connection 314. In some examples, the controller 322 may determine the local relative height differential between the first pressure and the second pressure sensor. The controller may, for example, transmit the relative local height differential to other machines connected to a local network via the connectivity module.

In some embodiments, the second sensor may be located at a known elevation. For example, on a multi-level jobsite such as a multi-story building, the second pressure sensor may be located on the ground floor. The second sensor may be also be configured to generate a second barometric pressure reading. In some embodiments, the second pressure sensor may be coupled to a user device 308. The user device may 308 may exchange data with the machine 324 via the connection 316 to the connectivity module 320. The user device 308 may be configured to display the relative elevation of the machine 324. In some embodiments, the controller 322 may be configured to compare the first pressure reading from the first pressure sensor to the second pressure reading from the second pressure sensor. The controller 322 may then calculate the relative elevation difference between the first pressure sensor and the second pressure sensor and determine the elevation of the machine 324. In some embodiments, the sensor measurements comparison and calculation may be performed by the user device 308 or a remote computing device 306. In some examples, the machine controller 322 is configured to determine the position of the machine 324 with respect to a floorplan of a work site (e.g. the position of the machine is identified with a floor of a structure in which the machine is located).

For example, a machine may be located on a floor of a 10-story building and include a first pressure sensor. A second pressure sensor may be located on the first floor of the building and coupled to a computer terminal (e.g., a user device 308). A first pressure reading from the first pressure sensor may be transmitted via a wireless network from the connectivity module 320 of the machine 324 to the user device 308. The user device may compare the pressure readings and calculate that the first pressure sensor is approximately eighty-four feet higher in elevation that the second pressure sensor. The user device 308 may then access stored building information that indicates that each floor is 12 feet in height. The user device may then determine that the machine 324 is seven floors above the user device, on the eighth floor, by dividing eighty-four feet by 12 feet per floor. In some examples, the machine controller 322 may determine the position of a machine on a network (e.g. a mesh network) with respect to another machine 304. In some embodiments, pressure readings from pressure sensors coupled to several machines 304 may be used to calculate the relative elevation of each machine.

In some examples, the machine controller 322 receives pressure sensor data from a second sensor at a load or extendable implement (e.g., a work platform or a scissor lift, a set of forks of a forklift, etc.) of the machine 324. The relative pressure difference between the pressure measured by the first sensor coupled to the chassis and the pressure measured by the second sensor coupled to the extendable implement can be used to calculate the operational height of the extendable implement. The operational height of the platform may be transmitted, for example, to other machines 304 connected to the local network 312, to a remote computing device 306 via a network connection to a work site hub device. In some examples, the operational height of the platform may be provided for external consumption by other devices connected to the network or used as part of the machine's 324 local controls. In some examples, the relative pressure difference between a first pressure sensor attached to a chassis of the machine 324 and a second pressure sensor attached to an implement or located at a may be transmitted to the controller 322. In some examples, the controller 322 may use the first pressure measurement and the second pressure measurement to calculate or verify a height of the extendable implement or the load. The controller may, for example, use the calculated or verified height of the implement or the load as a safety check within a height safety application supported by the work site network. For example, depending on the worksite, a machine 324 may have a lower maximum operational height that the machine is capable of reaching. For example, the worksite may be indoors with low ceilings or outdoors with high winds, causing the maximum safe working height of the machine 324 to be restricted. The controller 322 may store a maximum safe operational height for various locations on a work site and may compare the maximum safe working height to the operational height of the extendable implement, and may prevent the extendable implement from exceeding the maximum safe operational height.

In some embodiments, there may be a first pressure sensor coupled to the chassis of the machine 324, a second pressure sensor coupled to the extendable implement of the machine, and a third pressure sensor at a known elevation on a work site. The elevation of the chassis relative to the known elevation and the operational height of the extendable implement may both be calculated. The maximum safe operational height may be calculated based on the elevation of the chassis. The operational height of the extendable implement may then be calculated by comparing the first and second sensors and may be controlled to remain under the maximum safe operational height. For example a work site may have a ceiling height of forty feet above ground level. The elevation of the chassis of a forklift above the ground level may be determined by comparing a pressure reading from a pressure sensor coupled to the chassis to a pressure reading from a pressure sensor at ground level. If, for example, it is determined that the chassis is ten feet above ground level, a maximum safe operational height of the forks of the forklift may be calculated to be thirty feet by subtracting the calculated chassis height from the ceiling height.

In some embodiments, the connectivity module 322 is communicatively connected to a light attached to a work machine. The light may be a work machine light (e.g. a headlight) or a beacon light (e.g., an RGB LED light, machine state visual indicator 326) attached to the machine. In some embodiments, the light is configured to emit light in one or more colors, intensities, patterns, etc. In some embodiments, the connectivity module illuminates the light responsive to a command from a remote user device communicatively connected to the connectivity module via a wireless connection. In some embodiments, the user device transmits the command to illuminate the work machine light responsive to user interaction with a local fleet connectivity application hosted on the user device. In some embodiments, the connectivity module illuminates the light and activates an audible indicator responsive to the command from the remote user device. In some embodiments, visual and audible indicators may be used in conjunction or independently of one another. In some embodiments, a plurality of connectivity modules illuminates the lights attached to a plurality of work machines responsive to a command from a remote user device communicatively connected to the plurality of connectivity modules via a wireless connection. In some embodiments, the plurality of lights attached to the plurality of work machines are illuminated simultaneously in response to a single command from the remote user device. In some embodiments, the local fleet connectivity system generates commands to a plurality of work machines designated by a user interacting with the local fleet connectivity application hosted on a user device to activate lights or audible indicators and electronically pair a work machine selected by a user from the plurality of work machines with a digital model of the selected work machine generated by the local fleet connectivity application on the user device. For example, a user may observe a group of work machines at work site. The user may command a subset of the group of work machines to activate lights on or attached to the work machines using an application on a user device (e.g. a "find me" application). The user may, through the user application, designate the subset of work machine to be identified based on criteria selected through the application. Through the application and user device connected to work machines on the local fleet connectivity network, the user may activate lights, horns or other indicators on several different work machines and may select variations on lights (e.g. different colors, different patterns, different intensities, etc.) to distinguish between machines and quickly identify the desired machine or group of machines (e.g. "find me" commands to multiple machines at the same time). The application provides options for a user to identify a machine physically (thought observation of the light or a horn) and tie the identified machine to the digital model of the same machine generated by the application on the user device. For example, a user may tie a selected machine or group of machines identified physically by the user using the "find me" indications with a digital record for the machine (including serial number, service records), and access connected services for the machine available through the local fleet connectivity system (e.g. location, electronic commerce, use tracking, billing, maintenance support, etc.) all by means of In a further example, a user may apply additional criteria to machine identification commands. For example, a user input to the application criteria for machine states or conditions (e.g. fully charged, at least ½ fuel, no outstanding service issues, no faults detected on self-test, etc.), machine type (e.g. specific make, specific model, etc.), machine location (e.g. proximity to the user, proximity to a task, positioned for easiest movement out of a staging area, etc.). The provisions within the local fleet connectivity application and network for physically identifying machines and tying them to matching digital models including full digital machine records provides significant savings of time searching machines and manually confirming records (e.g. machine serial numbers). In a further example, a user may simultaneously communicate with a plurality of machines (e.g. directly using a mesh, Wi-Fi, or other local connection or remotely via a cloud network connection) that satisfy one or more selected criteria (e.g. machines that are the same model) and command them via the local fleet connectivity application to separately identify themselves (e.g., with different color lights). The user may then select the "green machine" indicated via the application user interface, the machine may flash its lights to indicate "this one" and the user can then tap an indicator in the application to verify machine selection and electronically pair a user device with that machine. The user may then access or enter information for selected machines and share the information with other devices connected to the local fleet connectivity system through the application.

The local fleet connectivity system with elevation based machine localization 300 further allows for the coordination of multiple machines 304, 324 within the same work site, or a fleet wide control. For example, if a first work machine 324 is required to accomplish a task collaboratively with a second work machine 304, a user interacting with a user device 308 may provide commands to the first work machine 324 and second work machine 304 to execute the task in collaboration.

Figure 4:
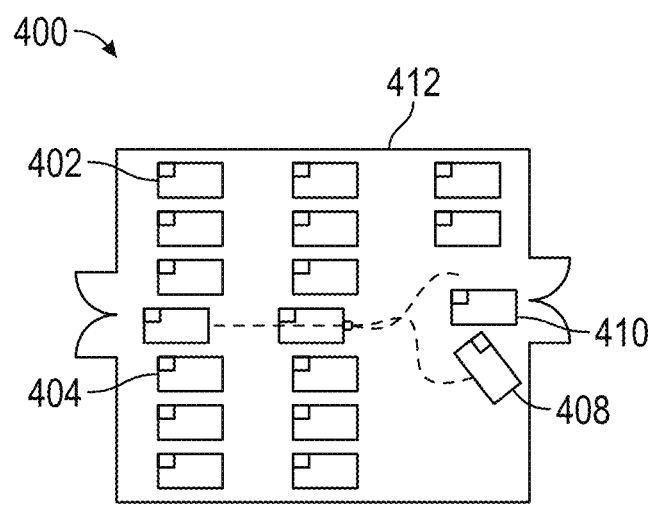
FIG. 4 is a schematic representation of a work site and equipment staging area with a local fleet connectivity system deployed, according to some embodiments.

As shown in FIG. 4, the equipment identification system 400 may be deployed at a work site 412 to control a fleet of work machines 402, 404, 408, 410 via the connectivity module 406 to collaboratively perform tasks requiring more than one work machine 408, 410. For example, a user may wish to move the work machine 410 from its stored position on the left of the work site 412 out the door on the right of the work site. The connectivity module may communicate with both the work machine 408 and the work machine 410, causing the work machine 408 to move out of the way of the work machine 410, so that the work machine 410 can move past the work machine 408 and out the doorway.

Figure 5:
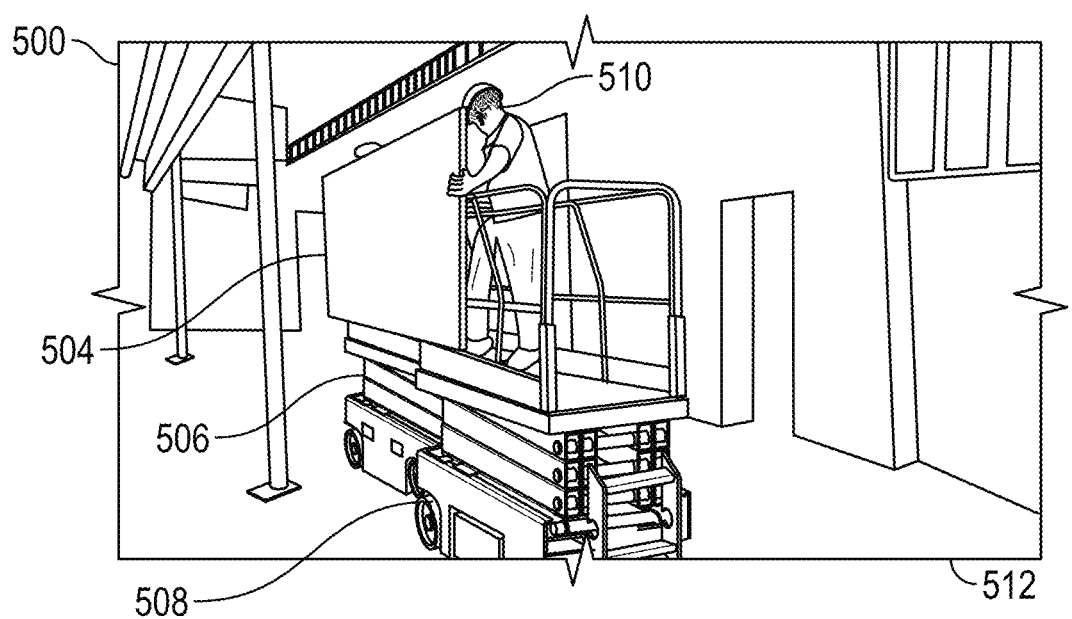
FIG. 5 is a picture representation of a work site with a local fleet connectivity system connecting two pieces of equipment, according to some embodiments.

As shown in FIG. 5, a plurality of work machines 506, 508 connected to local fleet connectivity system with elevation based machine localization 500 may collaboratively perform tasks on a jobsite 512 requiring more than one work machine, for example emplacing a section of drywall 504 that is too large to be handled by a single work machine. A user device may communicate with both the work machine 506 and the work machine 508 and cause them to move at the same speed and in the same direction so that a user 510 on each machine 506, 508 can hold the drywall 504 while the machines 508, 510 are moving. Connectivity between the machines 508, 508 and with the local fleet connectivity system with elevation based machine localization 500 can prevent the machines 508, 510 from being separated so that the users 510 do not drop the drywall 504.

Figure 6:
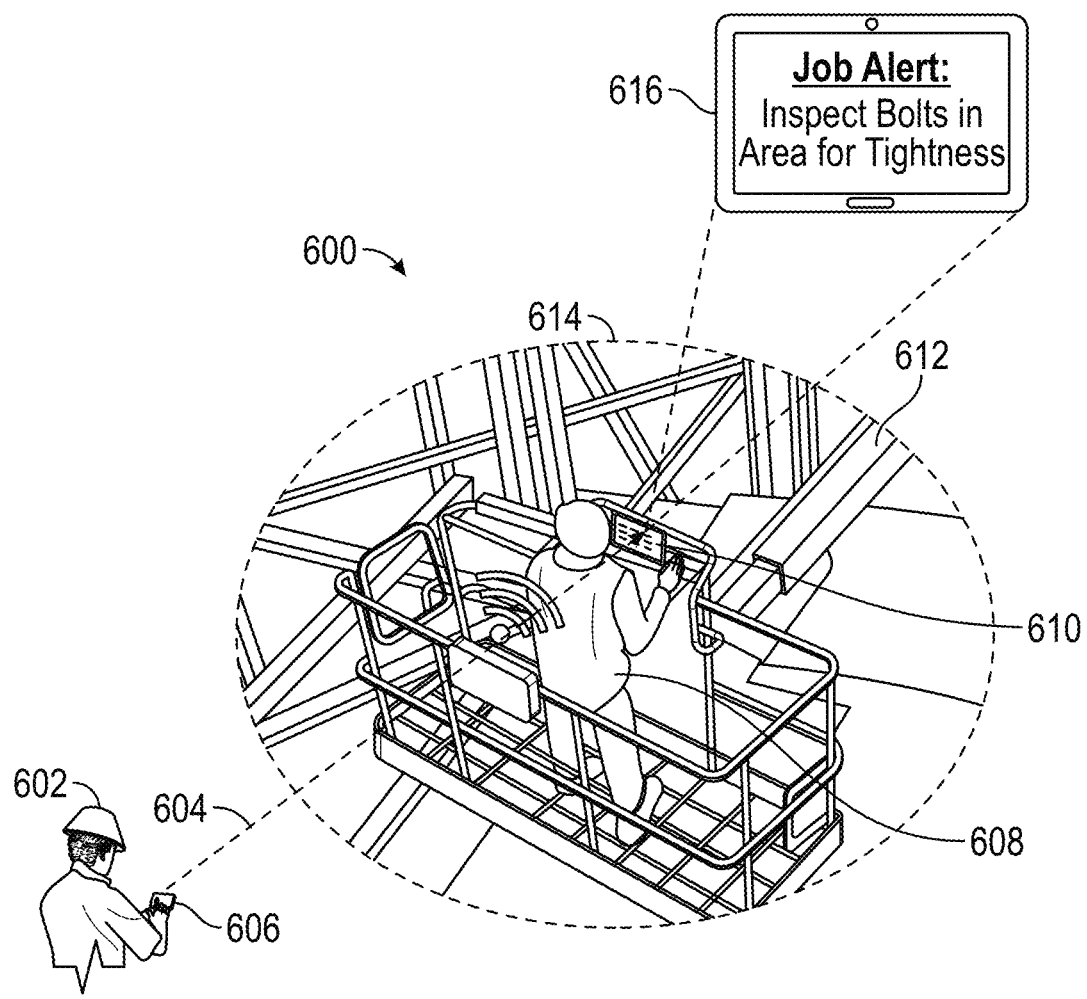
FIG. 6 is a picture representation of a piece of equipment with a local fleet connectivity system providing connectivity to a remote user, according to some embodiments.

As shown in FIG. 6, a remote user 602 of an equipment identification system 600 can send messages and data 604 from a remote device 606 to an onsite user 608 on a jobsite 614. The messages and data 604 may be received by the control system 610 of a work machine 612 and displayed via a user interface on an onboard display 616. The remote user 608 may send work instructions to the onsite user 608, informing the onsite user 608 of talks to be performed using the work machine 612. For example, as shown in FIG. 6, the remote user 602 may send instructions to the onsite user 608 to use the work machine 612 to inspect bolt tightness in the area. The instructions may displayed for the onsite user 608 on the onboard display 616. This allows the onsite user 608 to receive and view the instructions without the need to call the remote user 602 or write the instructions down. Because the work machine 612 is connected to the remote device 606 (e.g., via a connectivity module 218) the remote user 602 may receive the location of the work machine 612, as well as other work machines on the jobsite 614, and may use the location information to determine the instructions to send.

Figure 7:
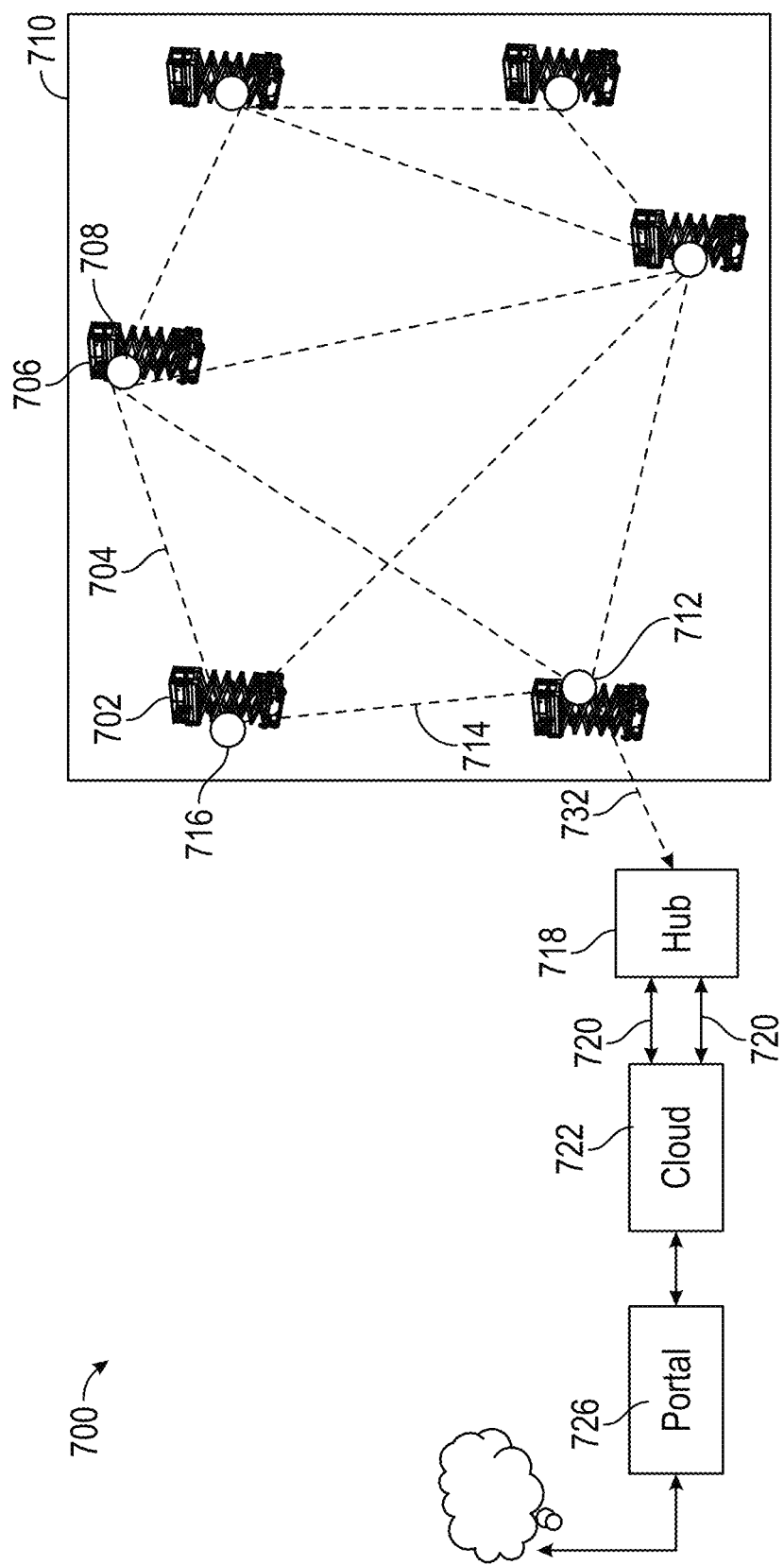
FIG. 7 is a schematic representation of a work site with a local fleet connectivity system deployed with connectivity to off-site systems, according to some embodiments.

Referring to FIG. 7, a local fleet connectivity network system 700 includes a connectivity hub 718. In some embodiments, the connectivity hub includes a connectivity module. In some embodiments, the connectivity hub is configured to communicatively connect with one or more connectivity module equipped machines 702, 706 in proximity to the connectivity hub 718. In some embodiments, the connectivity hub is configured to broadcast a work site identification signal. In some embodiments, the connectivity hub is configured to connect work site machines 702, 706 connected to the local fleet network to an external internet feed 720. In some configurations, the connectivity hub is configured as a gateway to one or more communications systems or network systems to enable exchanges of data 720, 722 between nodes 708, 712, 716 on the work site 710 local fleet connectivity mesh network 704, 714, 732 and nodes 726 external to the work site.

In some embodiments, connectivity hub has a connectively module to (a) provides the functionalities described here in place of or in addition to a machine that has a connectivity module, (b) broadcasts a site identifier, or (c) connects to an external internet to flow through data to and from the jobsite that is provided across the mesh.

Figure 8:
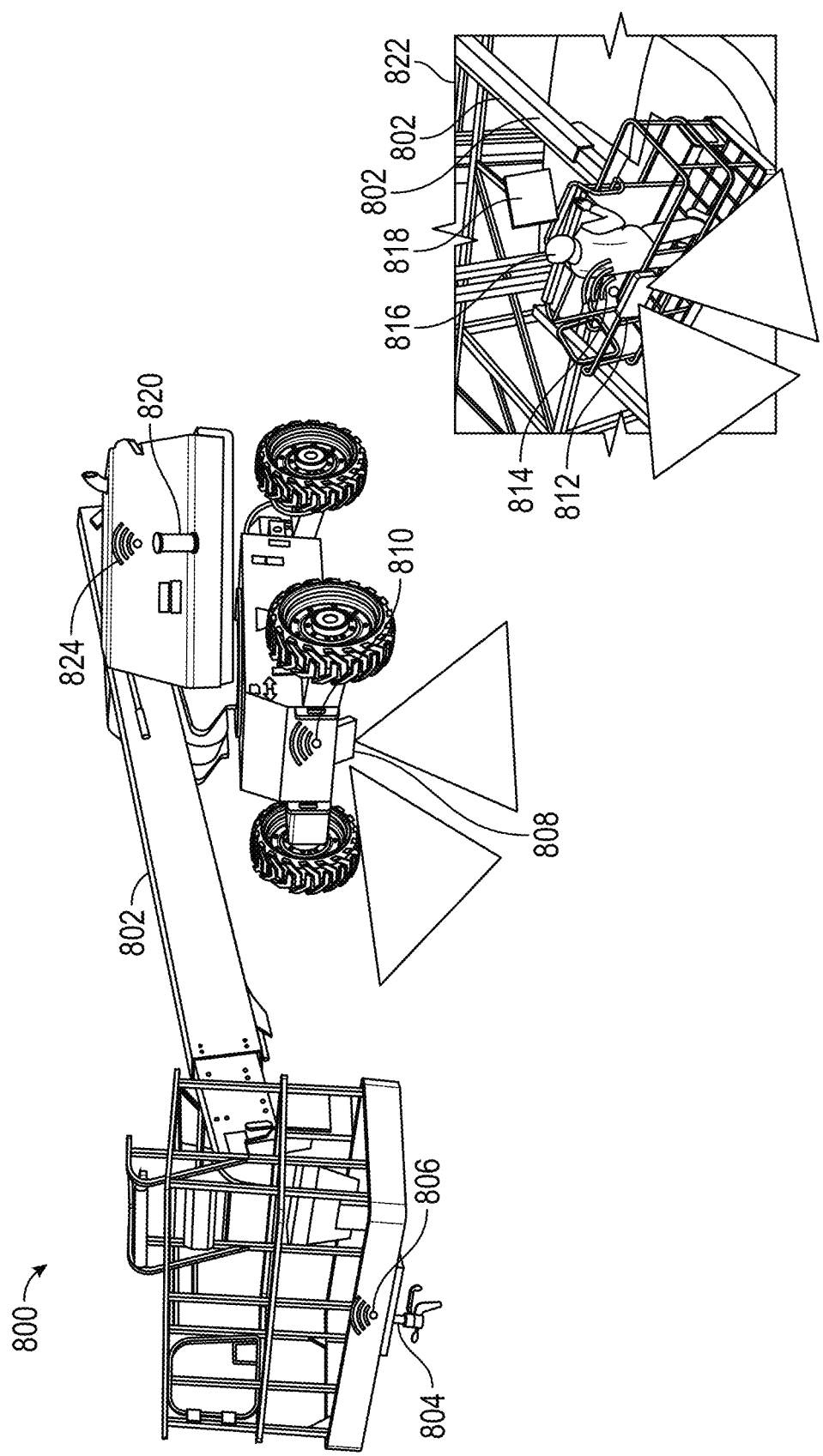
FIG. 8 is a picture representation of an apparatus configured with a local fleet connectivity system, according to some embodiments.

Referring to FIG. 8, a sensor network system 800 is shown. Sensors 804, 808, 812, 820 may be coupled to a work machine 802 on a jobsite 822. The sensors may be, for example, object detection sensors 808 812, environmental sensors 804 (e.g., wind speed, temperature sensors), and tagged consumable sensors 820. The sensors 804, 808, 812, 820 may be connected to and may send data to an equipment identification system via wireless connections 806, 810, 814, 824. The sensor data may displayed or may be used to generate messages for display on an onboard display 818 for a user 816 of the work machine 802. The onboard display 818 may receive the sensor data via a direct wired or wireless connection to the sensors. Alternatively the sensors may communicate with the onboard display through the equipment identification system (e.g., via a connectivity module 218). Sensor data from various work machines may be combined to map the jobsite 822 and to determine if environmental conditions are safe for using the work machines. Sensor data from the tagged consumable sensors 820 may be used to determine, for example, when tagged consumables must be replaced.

Figure 9:
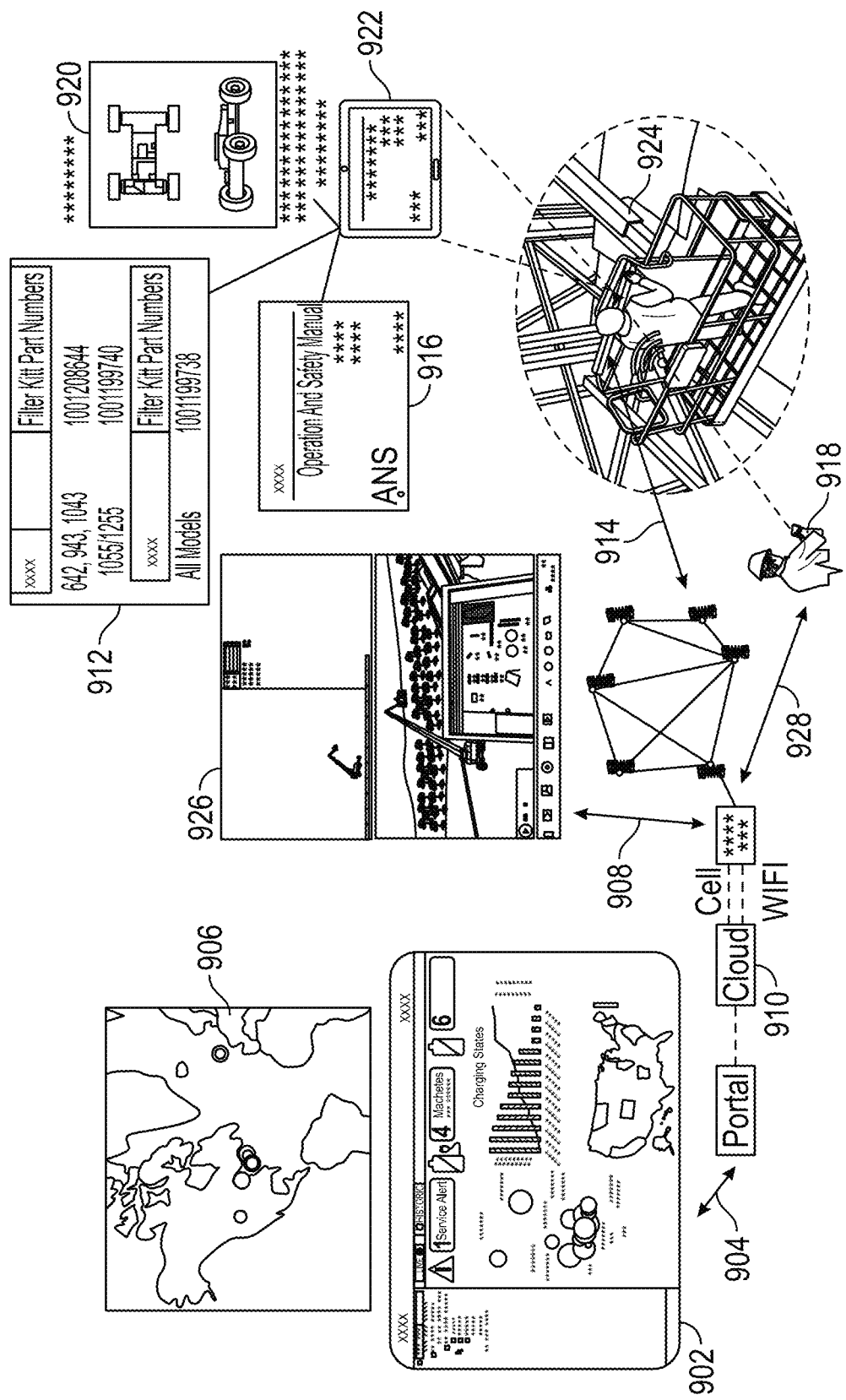
FIG. 9 is a graphical user interface of the local fleet connectivity system of FIG. 2, according to some embodiments.

As shown in FIG. 9, various user interfaces are available to be displayed on a remote user device 918 and an onboard display 922 of a work machine 924. A connectivity hub 910 may send and receive data 928, 908, 904 914 including the user interfaces 902, 906, 912, 916, 926, 920. The user interface 906 is a heatmap of locations of a plurality of work machines. The user interface 902 is a machine status display that shows the battery level, location, and alerts relating to a plurality of work machines. User interface 926 shows a digital twin of a work machine that updates based on sensor data of an associated work machine. User interface 912 is a list of part numbers for the work machine 924. User interface 916 is an operation and safety manual for the work machine 924. User interface 920 is a detailed schematic of the work machine 924.

Figure 10:
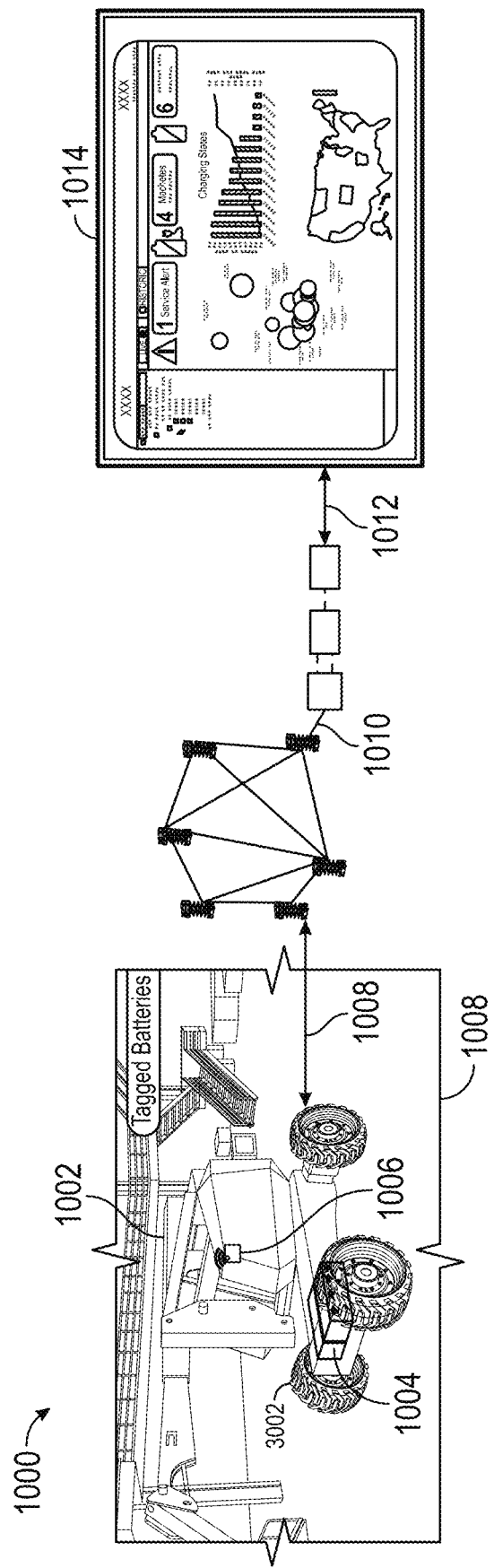
FIG. 10 is a picture representation of a work machine with machine specific output data connected to the local fleet connectivity system of FIG. 2, according to some embodiments

As shown in FIG. 10, a tagged consumable tracking system 1000 is shown. A work machine 1002 on a jobsite 1008 includes tagged consumables 1004 (e.g., batteries connected to battery charger 1006). The machine 1002 sends and receives data 1008 to and from the connectivity hub 1010. The connectivity hub 1010 sends and receives data 1012 to and from a user interface 1014. Data regarding the tagged consumables 1004 may be communicated to the user interface 1014 via the connectivity hub 1010. For example, battery charge state and battery health may be sent to the user interface 1014. When the battery health falls below a predetermined state, for example, when the battery is only able to hold half of its original charge, the connectivity hub 1010 may send an alert to the user interface 1014 indicating that the battery should be replaced.

Figure 11:
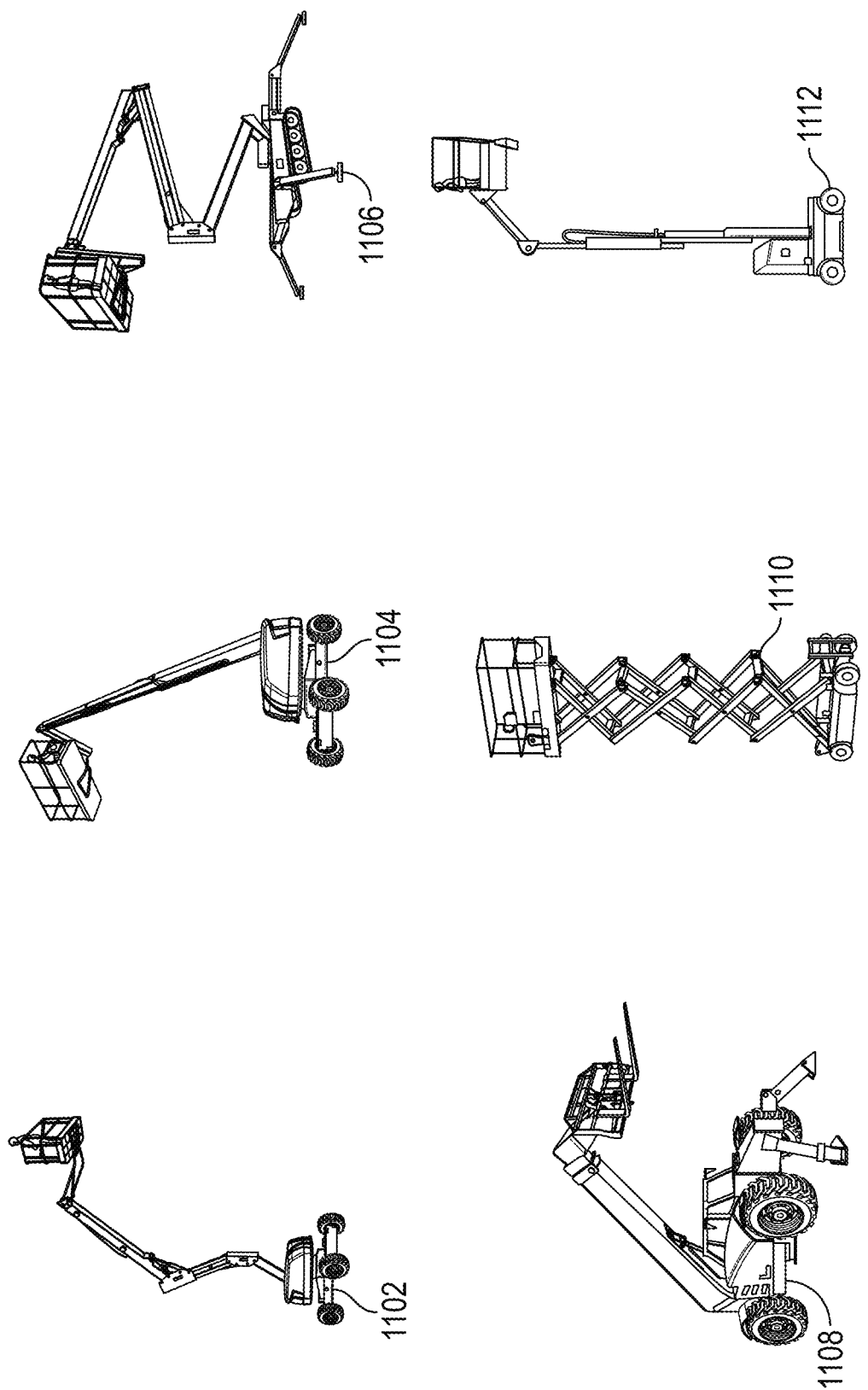
FIG. 11 is a picture representation of work machines configured for use in the local fleet connectivity system of FIG. 2, according to some embodiments.

As shown in FIG. 11, the boom of telescoping boom lift 1104 includes a first boom section (e.g., lower boom, etc.) and a second boom section (e.g., upper boom, etc.). In other embodiments, the boom includes a different number and/or arrangement of boom sections (e.g., one, three, etc.). According to an exemplary embodiment (e.g., articulating boom lift 1102), the boom is an articulating boom assembly. In one embodiment, the upper boom is shorter in length than lower boom. In other embodiments, the upper boom is longer in length than the lower boom. According to another exemplary embodiment, the boom is a telescopic, articulating boom assembly. By way of example, the upper boom and/or the lower boom may include a plurality of telescoping boom sections that are configured to extend and retract along a longitudinal centerline thereof to selectively increase and decrease a length of the boom.

As shown in FIG. 11, the lower boom of telescoping boom lift 1104 has a first end (e.g., base end, etc.) and an opposing second end (e.g., intermediate end). According to an exemplary embodiment, the base end of the lower boom is pivotally coupled (e.g., pinned, etc.) to the turntable at a joint (e.g., lower boom pivot, etc.). The boom includes a first actuator (e.g., pneumatic cylinder, electric actuator, hydraulic cylinder, etc.), which has a first end coupled to the turntable and an opposing second end coupled to the lower boom. According to an exemplary embodiment, the first actuator is positioned to raise and lower the lower boom relative to the turntable about the lower boom pivot.

As shown in FIG. 11, the upper boom of telescoping boom lift 1104 has a first end (e.g., intermediate end, etc.), and an opposing second end (e.g., implement end, etc.). According to an exemplary embodiment, the intermediate end of the upper boom is pivotally coupled (e.g., pinned, etc.) to the intermediate end of the lower boom at a joint (e.g., upper boom pivot, etc.). As shown in FIG. 11, the boom of telescoping boom lift 1104 includes an implement (e.g., platform assembly) coupled to the implement end of the upper boom with an extension arm (e.g., jib arm, etc.). In some embodiments, the jib arm is configured to facilitate pivoting the platform assembly about a lateral axis (e.g., pivot the platform assembly up and down, etc.). In some embodiments, the jib arm is configured to facilitate pivoting the platform assembly about a vertical axis (e.g., pivot the platform assembly left and right, etc.). In some embodiments, the jib arm is configured to facilitate extending and retracting the platform assembly relative to the implement end of the upper boom. The boom includes a second actuator (e.g., pneumatic cylinder, electric actuator, hydraulic cylinder, etc.). According to an exemplary embodiment, the second actuator is positioned to actuate (e.g., lift, rotate, elevate, etc.) the upper boom and the platform assembly relative to the lower boom about the upper boom pivot.

Figure 12:
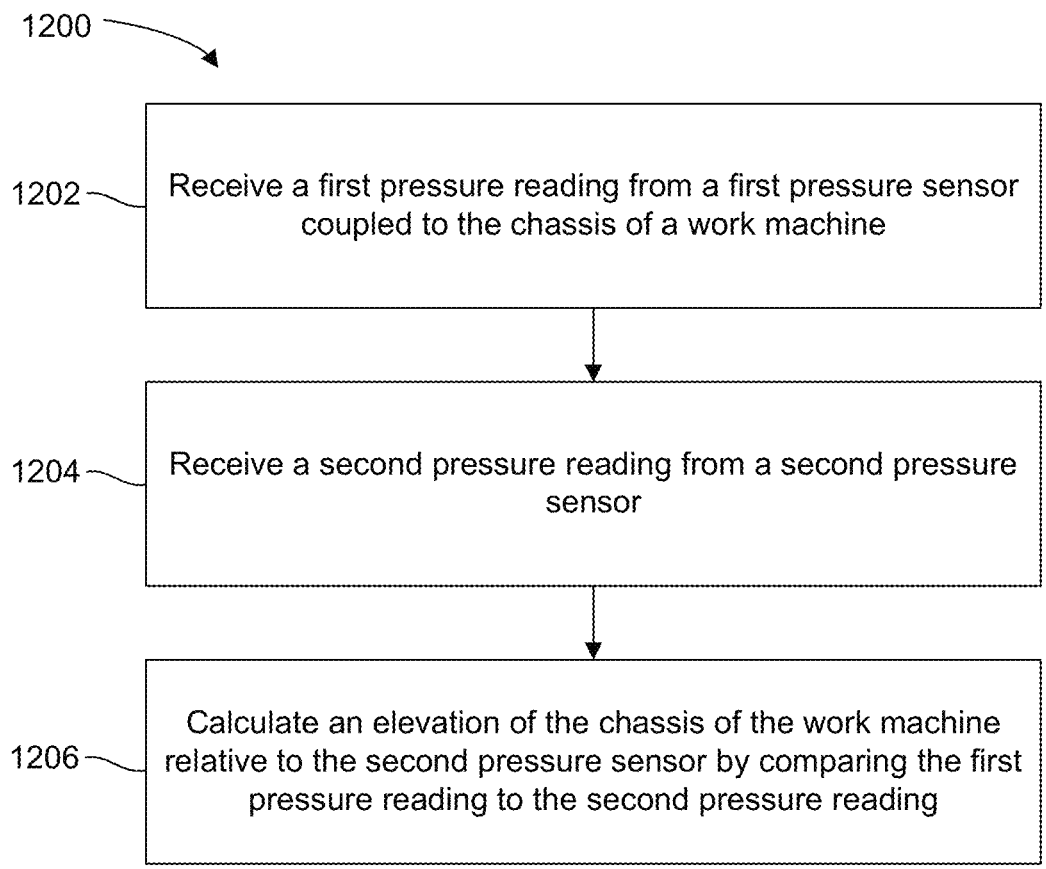
FIG. 12 is a flow diagram of a method for elevation based machine localization according to some embodiments.

Referring to FIG. 12, a process 1200 (or method) for elevation based machine localization is shown according to some embodiments. The method may be performed by one or more processing circuits comprising one or more memory devices coupled to one or more processors. The one or more memory devices may be configured to store instructions thereon that, when executed by the one or more processors, cause the one or more processors to perform the operations of the method. In some embodiments, the one or more processing circuits may be integrated into a remote computing system (e.g. cloud and web services 268). In other embodiments, the one or more processing circuits may be integrated into a user device (e.g. user device 272). In other embodiments, the one or more processing circuits may be integrated into a controller of a machine (e.g. controller 206, 322). One or more machines may connect to the user device via a local wireless connectivity system or via a cellular networks (e.g., via cell towers 240), or other existing or new means of digital connectivity. Each machine may include a connectivity module (e.g. connectivity modules 218, 320) for communicating with the user device, other machines, and/or the remote computing system. The one or more processing circuits may communicate across a wireless network by sending messages to the one or more machines and to one or more user devices each communicatively connected to the network. A user may interact with the machines via an application provided on the user device that displays a graphical user interface (GUI).

Following activation of a local fleet connectivity and deployment of work machines to a work site, the process 1200 begins with operation 1202. A first pressure reading is received from a first pressure sensor coupled to a chassis of a work machine. At process 1204, a second pressure reading is received from a second pressure sensor. In some embodiments, the second pressure sensor may be located at a known elevation and/or a known floor of a building. In some embodiments the second pressure sensor may be coupled to an extendable implement of the work machine. In some embodiments, the second pressure sensor may be coupled to a user device. The first and second pressure sensors may be configured to measure barometric pressure. At process 1206, a first relative election of the chassis of the work machine relative to the second pressure sensor is calculated by comparing the first pressure reading to the second pressure reading. For example, the barometric pressure measured by the first sensor may be compared to the barometric pressure of the second pressure sensor and the elevation of the chassis above the second pressure sensor may be calculated based on the difference in barometric pressure. In some embodiments, the second pressure sensor may be located on a known floor of the building. The floor on which the machine is located may be determined based on the first relative elevation. The method 1200 may also include displaying the first relative elevation on the screen of the user device.

In some embodiments, the second pressure sensor may be coupled to the extendable implement of the work machine and an operational height of the extendable implement may be calculated based on the first relative elevation. The extendable implement may be, for example, a fork of a forklift or a work platform of a man lift. In some embodiments of the operational height may be transmitted via a wireless network to a remote computing system. In some embodiments there may be a first pressure sensor coupled to the chassis of the work machine, a second pressure sensor coupled to the extendable implement of the work machine, and a third pressure sensor located at a known elevation. The elevation of the chassis relative to the third pressure sensor at the known elevation may be calculated. A maximum operational height the extendable implement may be determined based on at least the calculated elevation of the chassis relative to the third pressure sensor. The calculated maximum operational height of the extendable implement may be transmitted to the work machine. The work machine may be controlled to prevent the extendable implement from exceeding the calculated maximum operational height. In some embodiments, the calculated relative elevations and operational heights may be reported to a user device or other remote computing device. A notification may be generated containing the calculated relative elevations and/or operational heights.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-3, it should be understood that the controller 44 may include any number of circuits for completing the functions described herein. For example, the activities and functionalities of the control system 60 may be combined in multiple circuits or as a single circuit. Additional circuits with additional functionality may also be included. Further, the controller 44 may further control other activity beyond the scope of the present disclosure.

As mentioned above and in one configuration, the "circuits" of the control system 60 may be implemented in machine-readable medium for execution by various types of processors, such as the processor 52 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the load map interface systems and methods as shown in the various exemplary embodiments is illustrative only. Additionally, any element disclosed in one embodiment may be incorporated or utilized with any other embodiment disclosed herein. For example, the warning zones of the exemplary embodiment may be eliminated or additional zones may be added. Although only one example of an element from one embodiment that can be incorporated or utilized in another embodiment has been described above, it should be appreciated that other elements of the various embodiments may be incorporated or utilized with any of the other embodiments disclosed herein.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A machine localization system comprising:
a work machine including a chassis and an extendable implement;
a first pressure sensor coupled to the work machine;
a second pressure sensor located at a known elevation; and
a computing system operably coupled to the work machine, the first pressure sensor, and the second pressure sensor, wherein the computing system is configured to:
receive a first pressure reading from the first pressure sensor and a second pressure reading from the second pressure sensor;
determine an elevation of the work machine based on at least the first pressure reading and the second pressure reading;
determine a maximum operating height of the extendable implement based on at least the determined elevation; and
configure the extendable implement to not exceed the maximum operating height.

2. The machine localization system of claim 1, wherein the first pressure sensor is coupled to the chassis of the work machine.

3. The machine localization system of claim 1, wherein the computing system is configured to determine the elevation of the work machine by comparing the first pressure reading and the second pressure reading.

4. The machine localization system of claim 3, wherein the elevation is a relative elevation of the chassis relative to the second pressure sensor.

5. The machine localization system of claim 1, wherein the computing system is further configured to determine a floor of a building on which the work machine is located based on the elevation of the work machine.

6. The machine localization system of claim 5, wherein determining the maximum operating height of the extendable implement is further based on the determined floor.

7. The machine localization system of claim 1, wherein the extendable implement is a forklift fork or a man lift work platform.

8. The machine localization system of claim 1, wherein the computing system is configured to determine a location of the work machine, wherein determining the maximum operating height of the extendable implement is further based on the location of the work machine.

9. The machine localization system of claim 8, wherein determining the maximum operating height of the extendable implement is further based on a height of a known overhead obstruction at the location of the work machine.

10. The machine localization system of claim 1, wherein configuring the extendable implement to not exceed the maximum operating height comprises comparing a measured height of the extendable implement to the maximum operating height.

11. A method of controlling a work machine comprising a chassis and an extendable implement, the method comprising:
receiving, from a first pressure sensor coupled to the work machine, a first pressure reading;
receiving, from a second pressure sensor located at a known elevation, a second pressure reading;
calculating an elevation of the work machine based on at least the first pressure reading and the second pressure reading;
determining a maximum operating height of the extendable implement of the work machine based on at least the determined elevation; and
controlling the work machine to prevent the extendable implement from exceeding the maximum operating height.

12. The method of claim 11, wherein determining the maximum operating height of the extendable implement comprises comparing the first pressure reading and the second pressure reading.

13. The method of claim 11, wherein the first pressure sensor is coupled to the chassis and the elevation is a relative elevation of the chassis relative to the second pressure sensor.

14. The method of claim 11, further comprising determining a floor of a building on which the work machine is located based on the elevation of the work machine, wherein determining the maximum operating height of the extendable implement is further based on a ceiling height of the determined floor.

15. The method of claim 11, further comprising determining a location of the work machine, wherein determining the maximum operating height of the extendable implement is further based on a height of a known overhead obstruction at the location of the work machine.

16. The method of claim 11, further comprising receiving a measured wind speed from a wind speed sensor, wherein determining the maximum operating height of the extendable implement is further based on the measured wind speed.

17. A machine localization system comprising:
one or more processing circuits comprising one or more memory devices coupled to one or more processors, the one or more memory devices configured to store instructions thereon that, when executed by the one or more processors, cause the one or more processors to:
receive, from a first pressure sensor coupled to a work machine, a first pressure reading;
receive, from a second pressure sensor located at a known elevation, a second pressure reading;
calculate an elevation of the work machine relative to the second pressure sensor by comparing the first pressure reading to the second pressure reading;
determine a maximum operating height of an extendable implement of the work machine based on at least the elevation; and
configure the extendable implement to not exceed the maximum operating height.

18. The system of claim 17, wherein determining the maximum operating height of the extendable implement comprises comparing the first pressure reading and the second pressure reading.

19. The system of claim 17, wherein the instructions further cause the one or more processors to receive a measured wind speed from a wind speed sensor, wherein determining the maximum operating height of the extendable implement is further based on the measured wind speed.

20. The system of claim 17, wherein determining the maximum operating height of the extendable implement is further based on a height of an overhead obstruction.

* * * * *